(12) United States Patent
Fan et al.

(10) Patent No.: US 9,558,559 B2
(45) Date of Patent: Jan. 31, 2017

(54) METHOD AND APPARATUS FOR DETERMINING CAMERA LOCATION INFORMATION AND/OR CAMERA POSE INFORMATION ACCORDING TO A GLOBAL COORDINATE SYSTEM

(71) Applicant: Nokia Corporation, Espoo (FI)

(72) Inventors: Lixin Fan, Tampere (FI); Junsheng Fu, Tampere (FI); Kimmo Roimela, Tampere (FI); Yu You, Kangasala (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 319 days.

(21) Appl. No.: 13/857,688

(22) Filed: Apr. 5, 2013

(65) Prior Publication Data
US 2014/0300637 A1    Oct. 9, 2014

(51) Int. Cl.
G09G 5/00 (2006.01)
G06T 7/00 (2006.01)
G06K 9/00 (2006.01)
(52) U.S. Cl.
CPC ......... G06T 7/0046 (2013.01); G06K 9/00664 (2013.01); *G06T 2207/30244* (2013.01)
(58) Field of Classification Search
None
See application file for complete search history.

(56) References Cited

U.S. PATENT DOCUMENTS

2009/0248300 A1* 10/2009 Dunko et al. ............... 701/209
2010/0002071 A1* 1/2010 Ahiska .......................... 348/36
2011/0169946 A1* 7/2011 Rudin ...................... G01S 5/16
                                                                  348/135
2012/0163656 A1   6/2012 Wang et al.
2013/0016123 A1* 1/2013 Skarulis ....................... 345/633

FOREIGN PATENT DOCUMENTS

WO         2010099036 A1      9/2010

OTHER PUBLICATIONS

Liu et al. (A systematic approach for 2D-image to 3D-range registration in urban environments, Oct. 2007, pp. 1-8, IEEE).*
Verhoeven et al. (Mapping by matching: a computer vision-based approach to fast and accurate georeferencing of archaeological aerial photographs, vol. 39, Issue 7, Jul. 2012, pp. 2060-2070, Journal of Archaeological science).*
Becker et al. (Combined feature extraction for façade reconstruction, ISPRS workshop on laser scanning 2007).*

(Continued)

*Primary Examiner* — Kyle Zhai
(74) *Attorney, Agent, or Firm* — Ditthavong & Steiner, P.C.

(57) ABSTRACT

An approach is provided for processing and/or facilitating a processing of one or more images to determine camera location information, camera pose information, or a combination thereof associated with at least one camera capturing the one or more images, wherein the camera location information, the camera pose information, or a combination thereof is represented according to a global coordinate system. The approach involves causing, at least in part, an association of the camera location information, the camera pose information, or a combination thereof with the one or more images as meta-data information.

20 Claims, 26 Drawing Sheets

(56) References Cited

OTHER PUBLICATIONS

Wagner et al. (Real-time Panoramic Mapping and Trackng on Mobile Phones, Mar. 20-24, 2010, pp. 211-218, IEEE).*
Snavely et al. (Photo Tourism: Exploring Photo Collection in 3D, 2006, ACM).*
M. Larson, "Automatic Tagging and Geotagging in Video Collections and Communities," Article No. 51, 8 pages, Apr. 2011, International Conference on Multimedia Retrieval (ICMR), Trento, Italy.
National Geospatial-Intelligence Agency, "NGA Standardization Document, Frame Sensor Model Metadata Profile Supporting Precise Geopositioning," Jul. 21, 2009, Version 2.0, pp. 1-56.
S. Teller et al., "Calibrated, Registered Images of an Extended Urban Area," Conference Publication, International Journal of Computer Vision, Jun. 2003, vol. 53, pp. 93-107.
Timo, "Nokia Challenge 2010: Where was this Photo Taken, and How?" website, http://comminfo.rutgers.edu/conferences/mmchallenge/2010/02/10/nokia-challenge/, pp. 1-6.
A. Vasile et al., "Efficient City-Sized 3D Reconstruction from Ultra-high Resolution Aerial and Ground Imagery," 2011, vol. 6938, pp. 347-358, published by Springer Berlin Heidelberg.
Liu et al., "Finding Perfect Rendezvous on the Go: Accurate Mobile Visual Localization and Its Applications to Routing", Proceedings of the 20th ACM International Conference on Multimedia, Jan. 1, 2012, 10 pages.
Hile et al., "Landmark-Based Pedestrian Navigation with Enhanced Spatial Reasoning", Pervasive Computing, vol. 5538 of the series Lecture Notes in Computer Science, May 11, 2009, pp. 59-76.
Bourke et al., "The social camera: A Case-Study in Contextual Image Recommendation", Proceedings of the 15th International Conference on Intelligent User Interfaces, Jan. 1, 2011, pp. 13-22.
Office Action for corresponding European Patent Application No. 14780308A-1906, dated Dec. 7, 2016, 7 pages.

* cited by examiner

METHOD AND APPARATUS FOR DETERMINING CAMERA LOCATION INFORMATION AND/OR CAMERA POSE INFORMATION ACCORDING TO A GLOBAL COORDINATE SYSTEM

BACKGROUND

Service providers and device manufacturers (e.g., wireless, cellular, etc.) are continually challenged to deliver value and convenience to consumers by, for example, providing compelling network services. One area of development has been the integration of location and image data to enable various services, for instance, navigation systems may use an image to determine location information associated with the image. However, even with the availability of associated images, their use with respect to providing location information has generally been limited. For example, point of interest (POI) information may be available in one or more images, however these readily available images have not been properly utilized because of lack mechanisms for associating them. Further, inefficient usage of geo-location metadata associated with video frames diminishes the effectiveness and efficiency for video sharing services. Accordingly, service providers and device manufacturers face significant technical challenges in enabling an automated analytic tool that finds camera position for uploaded images, thereby adding another dimension of location data from captured images to enhance user convenience.

SOME EXAMPLE EMBODIMENTS

Therefore, there is a need for an approach for processing one or more images to determine camera location information and/or camera pose information, wherein the information are represented according to a global coordinate system, thereby causing, at least in part, an association of the information with the one or more images as meta-data information.

According to one embodiment, a method comprises processing and/or facilitating a processing of one or more images to determine camera location information, camera pose information, or a combination thereof associated with at least one camera capturing the one or more images, wherein the camera location information, the camera pose information, or a combination thereof is represented according to a global coordinate system. The method also comprises causing, at least in part, an association of the camera location information, the camera pose information, or a combination thereof with the one or more images as meta-data information.

According to another embodiment, an apparatus comprises at least one processor, and at least one memory including computer program code for one or more computer programs, the at least one memory and the computer program code configured to, with the at least one processor, cause, at least in part, the apparatus to process and/or facilitate a processing of one or more images to determine camera location information, camera pose information, or a combination thereof associated with at least one camera capturing the one or more images, wherein the camera location information, the camera pose information, or a combination thereof is represented according to a global coordinate system. The apparatus also causes, at least in part, an association of the camera location information, the camera pose information, or a combination thereof with the one or more images as meta-data information.

According to another embodiment, a computer-readable storage medium carries one or more sequences of one or more instructions which, when executed by one or more processors, cause, at least in part, an apparatus to process and/or facilitate a processing of one or more images to determine camera location information, camera pose information, or a combination thereof associated with at least one camera capturing the one or more images, wherein the camera location information, the camera pose information, or a combination thereof is represented according to a global coordinate system. The apparatus also causes, at least in part, an association of the camera location information, the camera pose information, or a combination thereof with the one or more images as meta-data information.

According to another embodiment, an apparatus comprises means for processing and/or facilitating a processing of one or more images to determine camera location information, camera pose information, or a combination thereof associated with at least one camera capturing the one or more images, wherein the camera location information, the camera pose information, or a combination thereof is represented according to a global coordinate system. The apparatus also comprises means for causing, at least in part, an association of the camera location information, the camera pose information, or a combination thereof with the one or more images as meta-data information.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for processing one or more images to determine camera location information and/or camera pose information, wherein the information are represented according to a global coordinate system, thereby causing, at least in part, an association of the information with the one or more images as meta-data information, are disclosed.

In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Video hosting and sharing services are popular nowadays. Different types of geo-location metadata, such as GPS location and local camera poses are used in existing geo-augmented image/video services. However, these geo-location metadata are limited in several aspects. In one scenario, usually captured images may be geotagged to provide location information for the image, but a geotag is only related to the geographic position of a user's device at the moment of the image capture. As a result, the information captured in the image is missing at least one dimension of information. As mentioned before, even with the availability of associated location data and images, their use with respect to geospatial metadata has generally been limited to information derived from one image capture device without integrating images from other image capture devices. In addition, there is no existing solution to provide a 3D geo-augmented video data within a global coordinate system.

Figure 1:
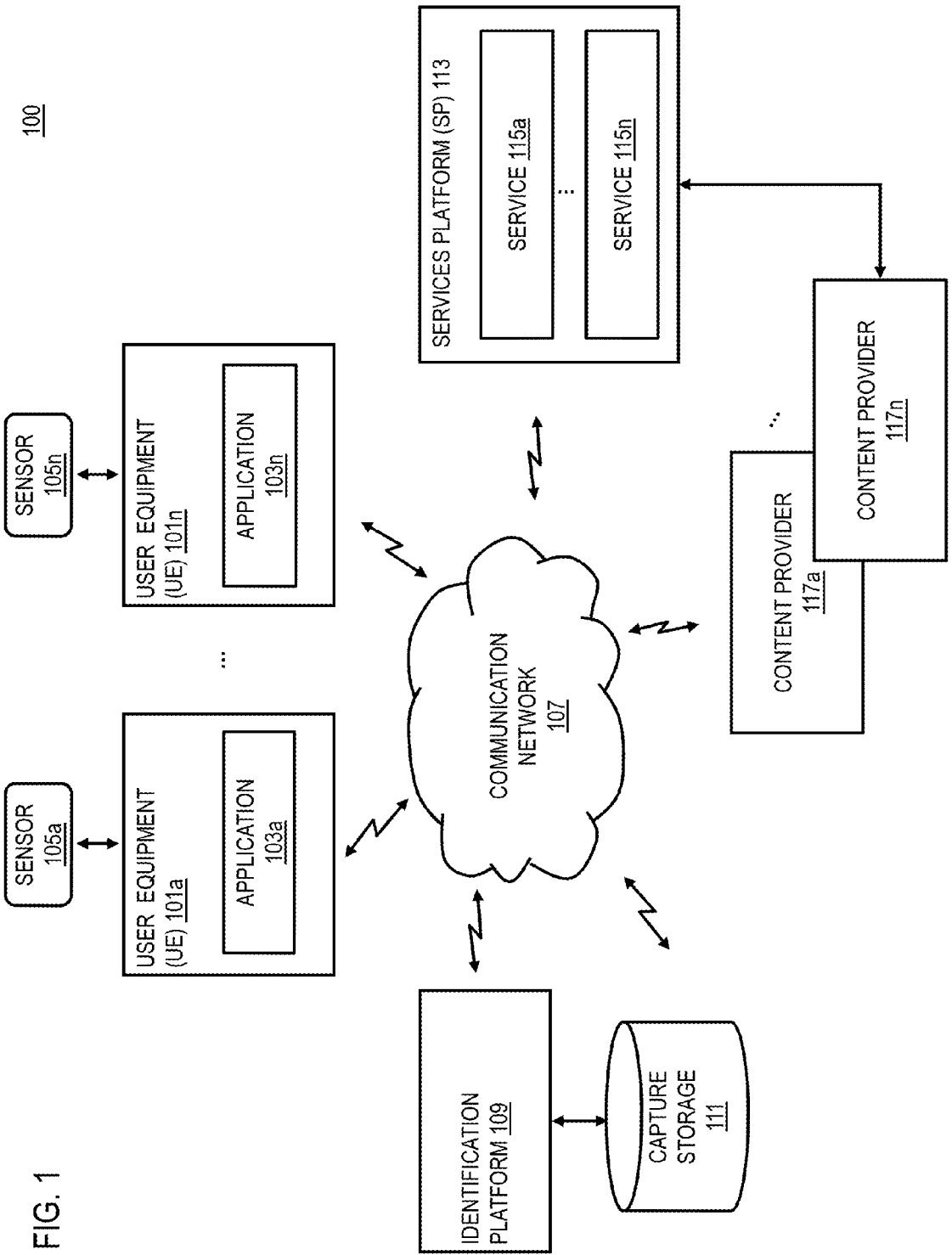
FIG. 1 is a diagram of a system capable of processing one or more images to determine camera location information and/or camera pose information, wherein these information are represented according to a global coordinate system, thereby causing, at least in part, an association of these information with the one or more images as meta-data information, according to one embodiment.

To address this problem, a system 100 of FIG. 1 introduces the capability for an automatic video post-processing method that extracts 3D geo-augmented metadata from input video frames and provides novel user experience in video sharing. In one embodiment, FIG. 1 introduces capability to identify elements within an image and processes the elements for further information, such as location information. In this way, users no longer need to independently look for information about POI in an image. Instead, a user may select POI, or element, in the image, and obtain location information specific to that particular POI, rather than location information that pertains to the full image. In one embodiment, the system is capable of automatically locating the camera pose for each frame in a global coordinate system, thereby when a user uploads a video, the system knows exactly where it was taken and the accurate camera position of each video frame. Further, the system may build navigation or touring video guides from multiple relevant videos around the similar 3D location. In addition, the system may analyze video frames and determine the camera metadata (the geo-location and the camera poses) without gyroscope sensor support.

The system 100 may build on the ready availability of location information and introduce the capability to apply the availability to elements within an image. The term "image" refers to pictures, videos, renderings (e.g., augmented reality renderings, virtual reality renderings), virtual worlds, and/or any other graphical depictions of one or more locations. In one embodiment, it is contemplated that the locations can be real-world locations or virtual locations (e.g., in a virtual world such as a gaming world or other virtual reality simulation). Moreover, the images can be presented in two-dimensions or three-dimensions.

More specifically, the system 100 processes one or more images (e.g., photographs, image streams, videos, pictures, etc.) to determine various elements within an image. In one embodiment, the picture or video may be a panoramic view of a city. In one scenario, elements within the city may be buildings or other landmarks. In some embodiments, the location information of the elements is previously embedded in the image. In other embodiments, location information is determined based on further processing of the image data.

As shown in FIG. 1, the system 100 comprises user equipment (UE) 101a-101n (collectively referred to as UEs 101) that may include or be associated with applications 103a-103n (collectively referred to as applications 103) and sensors 105a-105n (collectively referred to as sensors 105). In one embodiment, the UEs 101 have connectivity to an identification platform 109 via the communication network 107. In one embodiment, the identification platform 109 performs one or more functions associated with processing one or more images to determine camera location information and/or camera pose information, wherein these information are represented according to a global coordinate system, thereby causing, at least in part, an association of these information with the one or more images as meta-data information. Although the various embodiments described herein are discussed with respect to a global coordinate system based on an Earth centered Earth Fixed (ECEF) global coordinate system, it is contemplated that the various embodiments are applicable to any global coordinate system for identifying locations. For example, other applicable global coordinate systems include, but are not limited to, a world geodetic system (WGS84) coordinate system, a universal transverse Mercator (UTM) coordinate system, and the like.

By way of example, the UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the applications 103 may be any type of application that is executable at the UE 101, such as media player applications, social networking applications, calendar applications, content provisioning services, location-based service applications, navigation applications and the like. In one embodiment, one of the applications 103 at the UE 101 may act as a client for identification platform 109 and perform one or more functions associated with the functions of the identification platform 109 by interacting with the identification platform 109 over communication network 107.

By way of example, the sensors 105 may be any type of sensor. In certain embodiments, the sensors 105 may include, for example, a camera/imaging sensor for gathering image data, an audio recorder for gathering audio data, a global positioning sensor for gathering location data, a network detection sensor for detecting wireless signals or network data, temporal information and the like. In one scenario, the sensors 105 may include location sensors (e.g., GPS), light sensors, oriental sensors augmented with height sensor and acceleration sensor, tilt sensors, moisture sensors, pressure sensors, audio sensors (e.g., microphone), or receivers for different short-range communications (e.g., Bluetooth, WiFi, etc.). In one embodiment, the sensors 105 may detect user interaction with a user interface generated by the UE 101, applications 103, and/or the identification platform 109. The sensors 105 may work in conjunction with the identification platform 109, wherein the sensors 105 identifies a point on the user interface that the user selects, such as by brushing, clicking, or touching the screen of UE 101. The identification platform 109 may then correlate point(s) selected within an image, and consequently, find location information associated with that image.

The communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

In one embodiment, the identification platform 109 may be a platform with multiple interconnected components. The identification platform 109 may include multiple servers, intelligent networking devices, computing devices, components and corresponding software for processing one or more images to determine camera location information and/or camera pose information, wherein these information are represented according to a global coordinate system (e.g., ECEF, WGS84, UTM, etc.), thereby causing, at least in part, an association of these information with the one or more images as meta-data information. In addition, it is noted that the identification platform 109 may be a separate entity of the system 100, a part of the one or more services 115 of the services platform 113, or included within the UE 101 (e.g., as part of the applications 103).

As shown in FIG. 1, the UE 101 may display, via applications 103, one or more images (e.g. pictures or videos). In one embodiment, one or more elements depicted in one or more images may be landmarks or sites within an image. In one scenario, sensors 105 of UE 101 may permit the user to select an element of one or more images. This element selection may then prompt identification platform 109 to process the image data to obtain Global Positioning System (GPS) information associated with the image. The images may depict physical places, but they may also include virtual or computer-generated scenery. In one embodiment, the identification platform 109 may track images, match the images and extract 3D information from the images and then translate the 3D information to the global coordinate system.

In one embodiment, the identification platform 109 may extract geo location metadata from collection of images or sequences of video frames. Such extracted geo location metadata contains registered video frames, corresponding camera poses and reconstructed 3D point clouds defined within, for instance, a local 3D Cartesian coordinate system (CCS_3D_Local system) with known origin and axes. The camera poses and point clouds can be uniquely mapped to a 3D ECEF Cartesian coordinate system (CCS_3D_ECEF) or other global coordinate system (e.g., WGS84, UTM, etc.). In one scenario, the identification platform 109 may choose a camera pose by matching point cloud, and determining an area the point cloud matches up to, and then calculating the perspective of the video to get the camera pose information. The identification platform 109 may perform this process on a frame by frame basis to capture camera movement.

In one embodiment, the identification platform 109 may augment geocoordinate-tagged video by nearby POIs based on associated geo metadata. By way of example geocoordinate-tagged videos are rendered videos which are based on the output of ECEF coordinate tagging engine. In one embodiment, the identification platform 109 may give rise to corresponding change in the rendered POI data creating augmented-reality experience during playback based at least in part, on change of camera poses. In another embodiment, the identification platform 109 may tag panorama images with GPS information (e.g., latitude and longitude in a 2D geographic coordinate system (GCS_2D)), and based on panorama image geo-location information, geocoordinate-tagged video is augmented with nearby panorama images. The geocoordinate-tagged video data is reconstructed within the CCS_3D_ECEF system, making it possible to integrate nearby geocoordinate-tagged videos that are shot at different locations, time and by different people.

In one embodiment, the identification platform 109 may receive information from the sensors 105, and store the information on capture storage 111. The capture storage 111 may include identifiers to the UE or image as well as associated information. Further, the information may be any one of multiple types of information that can provide means for creating a rendering of the information in a contact-based user interface. The capture storage 111 may store information from the sensors 105, identification platform 109, content provider 117, and/or service platform 115 as processed through the identification platform 109 for the user to access at a later date.

The services platform 113 may include any type of service. By way of example, the services platform 113 may include mapping services, navigation services, travel planning services, social networking services, content (e.g., audio, video, images, etc.) provisioning services, application services, storage services, contextual information determination services, location based services, information (e.g., weather, news, etc.) based services, etc. In one embodiment, the services platform 113 may interact with the UE 101, the identification platform 109 and the content provider 117 to supplement or aid in the processing of the content information.

By way of example, services 115 may be an online service that reflects interests and/or activities of users. In one scenario, the services 115 provide representations of each user (e.g., a profile), his/her social links, and a variety of additional information. The services 115 allow users to share location information, activities information, contextual information, historical user information and interests within their individual networks, and provides for data portability. The services 115 may additionally assist in providing the identification platform 109 with travel information of the one or more geo-routes and/or location anchors, etc.

The content provider 117 may provide content to the UE 101, the identification platform 109, and the services 115 of the services platform 113. The content provided may be any type of content, such as textual content, audio content, video content, image content, etc. In one embodiment, the content provider 117 may provide content that may supplement content of the applications 103, the sensors 105, or a combination thereof. By way of example, the content provider 117 may provide content that may aid in the processing of the content information associated with POI to determine a route for map panning purposes. In one embodiment, the content provider 117 may also store content associated with the UE 101, the identification platform 109, and the services 115 of the services platform 113. In another embodiment, the content provider 117 may manage access to a central repository of data, and offer a consistent, standard interface to data, such as a repository of users' navigational data content.

By way of example, the UE 101, the identification platform 109, the services platform 113, and the content provider 117 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
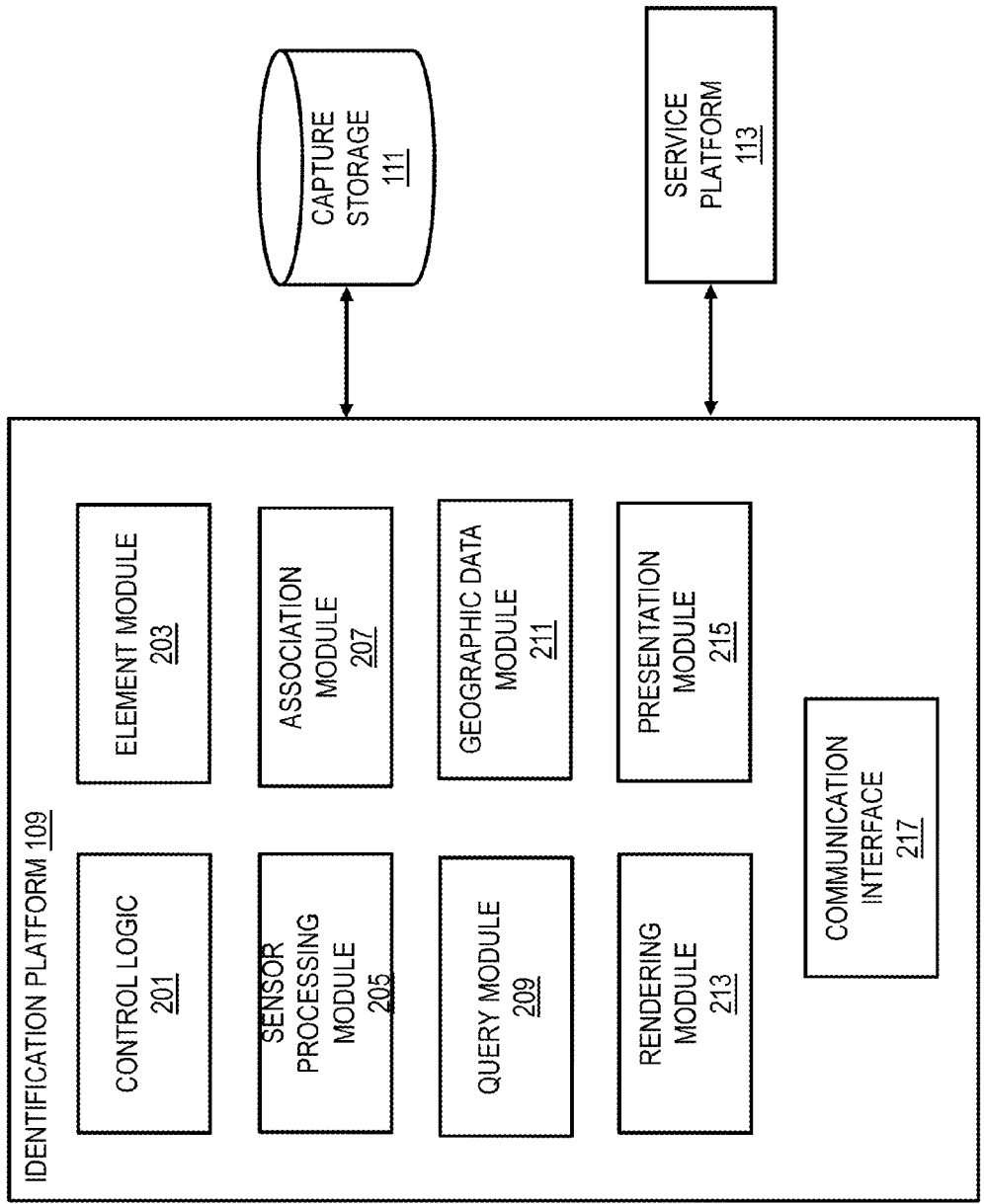
FIG. 2 is a diagram of the components of identification platform 109, according to one embodiment.

FIG. 2 is a diagram of the components of the identification platform 109, according to one embodiment. By way of example, the identification platform 109 includes one or more components for processing one or more images to determine camera location information and/or camera pose information, wherein these information are represented according to a global coordinate system, thereby causing, at least in part, an association of these information with the one or more images as meta-data information. It is contemplated that the functions of these components may be combined in one or more components or performed by other components of equivalent functionality. In this embodiment, the identification platform 109 includes control logic 201, element module 203, a sensor processing module 205, an association module 207, a query module 209, geographic data module 211, rendering module 213, presentation module 215 and communication interface 217.

The control logic 201 oversees tasks, including tasks performed by the element module 203, a sensor processing module 205, an association module 207, a query module 209, geographic data module 211, rendering module 213, presentation module 215 and communication interface 217. For example, although the other modules may perform the actual task, the control logic 201 may determine when and how those tasks are performed or otherwise direct the other modules to perform the task.

The element module 203 may work in conjunction with the sensors 105 to determine the element selected within an image. For example, the sensors 105 may detect a point in an image that has been selected by a user. The element module 203 may then determine an element within the image associated with the point selected by a user. In one scenario, sensors 105 may recognize a user touching a screen and selecting a point comprised of a number of pixels. Element module 203 may determine that the pixels touched are associated with a given element.

The sensor processing module 205 functions to determine related objects by processing sensor data from an imaging device, one or more other devices, or a combination thereof. Such sensor data may be transmitted via synchronization signals from one or more other devices. Furthermore, the sensor processing module 205 functions to determine, at least in part, at least one location, at least one tilt angle, at least one field-of-view, or a combination thereof of the at least one imaging device, the one or more other devices, or a combination thereof provided, in part, via sensors 105. Further, to determine related objects of one or more subjects, location information may be pre-determined and embedded in the image data.

By way of example, the image is associated with metadata for representing the one or more subjects or related objects depicted in an image. In addition, one or more user or auto-generated tags may be packaged as metadata for association with the image. The association module 207 may function by creating collections of multiple images. Further, information derived from transmitted signals from one or more other devices may be associated with images. In some embodiments the association module 207 derives data from information posted, stored, published, featured or otherwise broadcast to one or more subscribers of a service, i.e., a social networking, location service, online map service, or a combination thereof. In a further embodiment, the association module 207 provides information from determined candidate objects and inputs specifying the at least one object from among one or more candidate object. In another further embodiment, the association module causes an association between at least one image and queried information related to an environment depicted in the at least one image, wherein the information includes real-time information, historical information, or a combination thereof.

The query module 209 queries for information related to an environment depicted in the captured image, wherein the information includes real-time information, historical information, or a combination thereof. Query module 209 function to effectuate a query via communication network 107 of any available network component, including, but not limited to one or more available UE 101, content provider 117a, services platform 113, or a combination thereof. In an exemplary situation, query module 209 queries data including information posted, stored, published, featured or otherwise broadcast to one or more subscribers of a service, i.e., a social networking or location service. By way of example, query module 209 queries data via any offline or hosted/online applications or services for storing and sharing event information, utilizing information derived from captured data (e.g., image data, audio data, video data, etc.).

The geographic data module 211 manages and controls determination of location information associated with the identified element. The geographic data module 211 may obtain this location information in a variety of ways. In one embodiment, the geographic data module 211 may employ a map application to determine the location information. In one scenario, the geographic data module may determine a model of an element, identify the element by matching the element to the model, and then determine the location information from data offered by the model. In a further embodiment, the geographic data module 211 may use image recognition to identify the element chosen, and then find location information associated with the identity.

In another embodiment, the geographic data module 211 may employ a more interactive method of prompting the user to select an image tied more closely to the element. From there, geographic data module 211 may use a map application such as an online map application to determine location information of the element. More specifically, the location can be determined by a triangulation system such as a GPS system, assisted GPS (A-GPS), wireless local area network triangulation, or other location extrapolation technologies. Standard GPS and A-GPS systems can use satellites to pinpoint the location (e.g., longitude, latitude, and altitude) of the element. GPS coordinates can provide finer detail as to the location of the element.

Alternately, geographic data module 211 may determine the location information of one or more elements using an overlaid city map, and mapped to the location depicted. By matching the city map overlay with the location selected, location information may be found. In one embodiment, to determine the location information of one or more elements, locations may be pre-determined and embedded in the image data. In one embodiment, selecting an element within an image may directly retrieve location information. In one scenario, the possible use of the magnetometer (compass) integrated in a device can help in determining the direction the user is facing and thus help match the city map overlay with the location selected.

Once the element's location information has been determined by the geographic data module 211, the rendering module 213 may determine preferences from, at least in part, users, content provider 117, the services platform 113, or some combination thereof. In one embodiment, content provider 117 and/or the services platform 113 may specify that elements with associated location information be demarcated so that users can clearly see where location information is available. In one scenario, demarcation may take the form of highlighting the elements that are available for selection by the user. In a further embodiment, the rendering module 213 may work with the element module 203 to determine the portions of the image that constitute the element so that the rendering module 213 may know where to highlight the image. In one scenario, rendering may be the last major step, giving the final appearance to animation. Given the geocoordinate-tagged video data from the coordinate tagging engine, the video can be rendered either in the server side or the client side. The geocoordinate-tagged video data gives the users the camera parameters (e.g., pose, focal length) for each frame or selected frames (e.g., one frame of every 60 frames), hence any standard augmented reality rendering technique can be used.

The presentation module 215 may control the display of a user interface as dictated by specifications drawn from the rendering module 213. In one embodiment, the rendering module identifies preferences as to what to display, while the presentation module 215 executes the creation of a user interface in accordance with the preferences. For example, once the rendering module 213 determines portions of an image to highlight, the presentation module 215 may create the highlighted image on a user interface for the user to interact with. In another embodiment, the presentation module 215 may further create a rendering of location information as selected by the user, and possibly offer further details on location information for the user to pick.

The communication interface 217 manages and controls any incoming and outgoing communication such as image and element analysis, data sharing, receiving various requests for location information and/or renderings of the location information from other UEs 101 or the content provider 117, services platform 113, and/or the services 115. The communication interface 217 can also manage other communications of the UE 101 such as internet communications. For example, as discussed above, the rendering module 213 may retrieve element information from the element module 203 and geographic data module 211, via the communication interface 217, in order to render images with selectable elements highlighted. The UE 101 may also be connected to storage media such as the capture storage 111 such that the identification platform 109 can access or store communication history data. By way of example, if the capture storage 111 is not local, then it may be accessed via the communication network 107.

Figure 3:
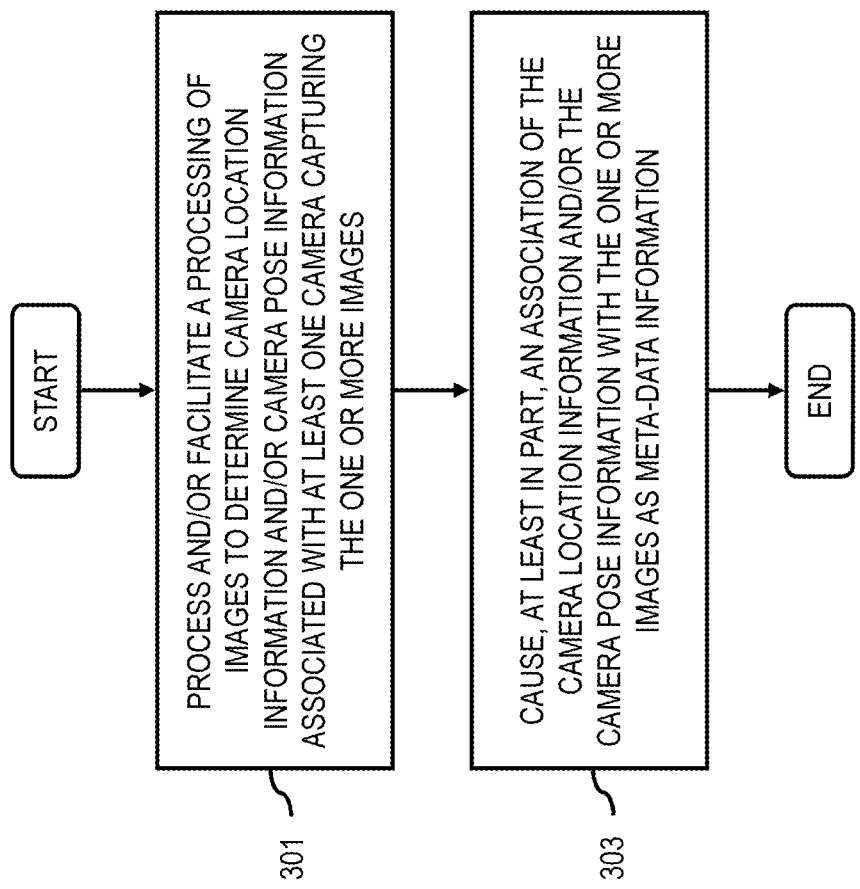
FIGS. 3-7 are flowcharts for processing one or more images to determine camera location information and/or camera pose information, wherein these information are represented according to a global coordinate system, thereby causing, at least in part, an association of these information with the one or more images as meta-data information, according to various embodiments.
Figure 24:
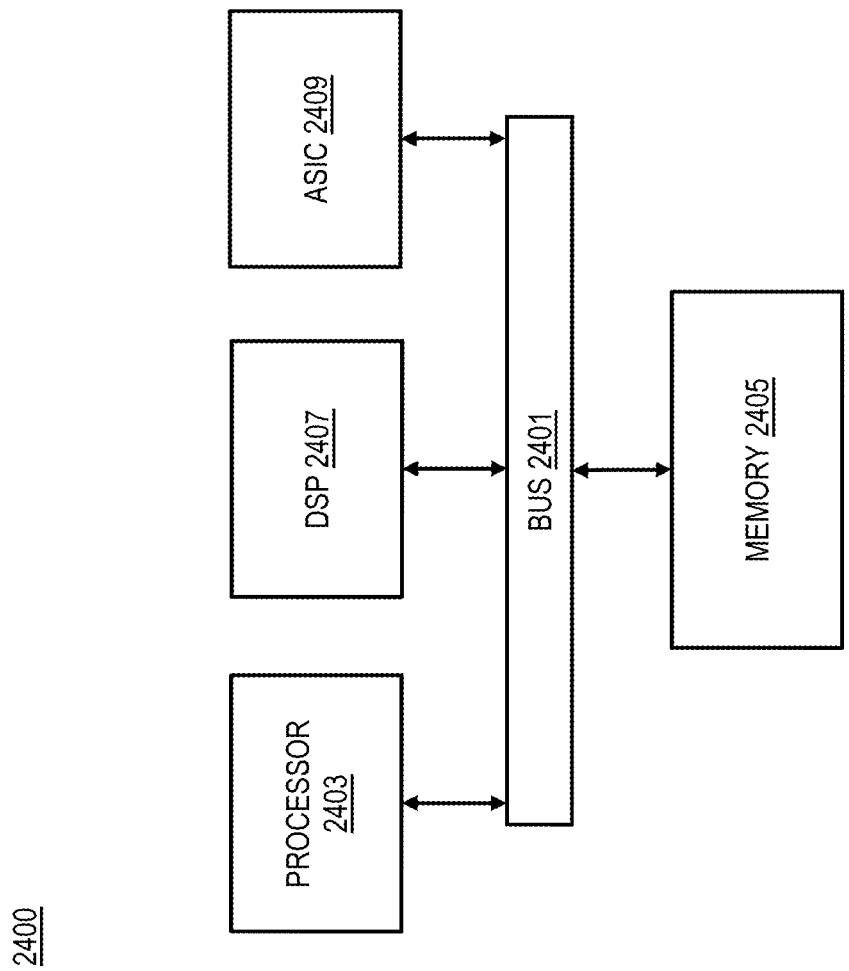
FIG. 24 is a diagram of a chip set that can be used to implement an embodiment of the invention.

FIG. 3 is a flowchart for processing one or more images to determine camera location information and/or camera pose information, wherein these information are represented according to a global coordinate system, thereby causing, at least in part, an association of these information with the one or more images as meta-data information. In one embodiment, the identification platform 109 performs the process 300 and is implemented in, for instance, a chip set including a processor and a memory as shown in FIG. 24.

In step 301, the identification platform 109 processes and/or facilitates a processing of one or more images to determine camera location information, camera pose information, or a combination thereof associated with at least one camera capturing the one or more images, wherein the camera location information, the camera pose information, or a combination thereof is represented according to a global coordinate system. In one embodiment, wherein the global coordinate system includes, at least in part, a global ECEF Cartesian coordinate system, a world geodetic system (WGS84) coordinate system, a universal transverse Mercator (UTM) coordinate system, or a combination thereof. As previously noted, the example embodiments described herein are applicable to any global coordinate system and it is contemplated that embodiments of the system 100 apply equally to ECEF, WGS84, UTM, and the like. By way of example, like ECEF, a WGS 84 coordinate system provides a single, common, accessible 3-dimensional coordinate system for geospatial data collected from a broad spectrum of sources. WGS 84 is geocentric, whereby the center of mass is being defined for the whole Earth. Similarly, a UTM coordinate system is a global coordinate projection system using horizontal position representation. In one embodiment, UTM is used to identify locations on the earth independently of vertical position, and is not a single map projection. In one embodiment, one or more images are part of the at least one video sequence, causing at least in part, a selection of the one or more images from among one or more frames of the at least one video, wherein the one or more images represent, at least in part, a subset of the one or more frames. In one scenario, a user may be looking for ABC museum within an image of New York City. The identification platform 109 may then determine data associated with the one or more images from one or more frames to give an accurate depiction of ABC museum in New York City. In another embodiment, one or more other images are further determined based, at least in part, on one or more contextual criteria, and wherein one or more contextual criteria include, at least in part, one or more temporal criteria. In one scenario, the identification platform 109 may determine images captured at different time representing one or more contextual criteria, for instance, time stamps, seasons, weather etc.

In step 303, the identification platform 109 causes, at least in part, an association of the camera location information, the camera pose information, or a combination thereof with the one or more images as meta-data information. In one scenario, the identification platform 109 may take into consideration for the camera pose information, the physical position of a camera in the space and the differences in the lens that affects the field of view of the camera.

Figure 4:
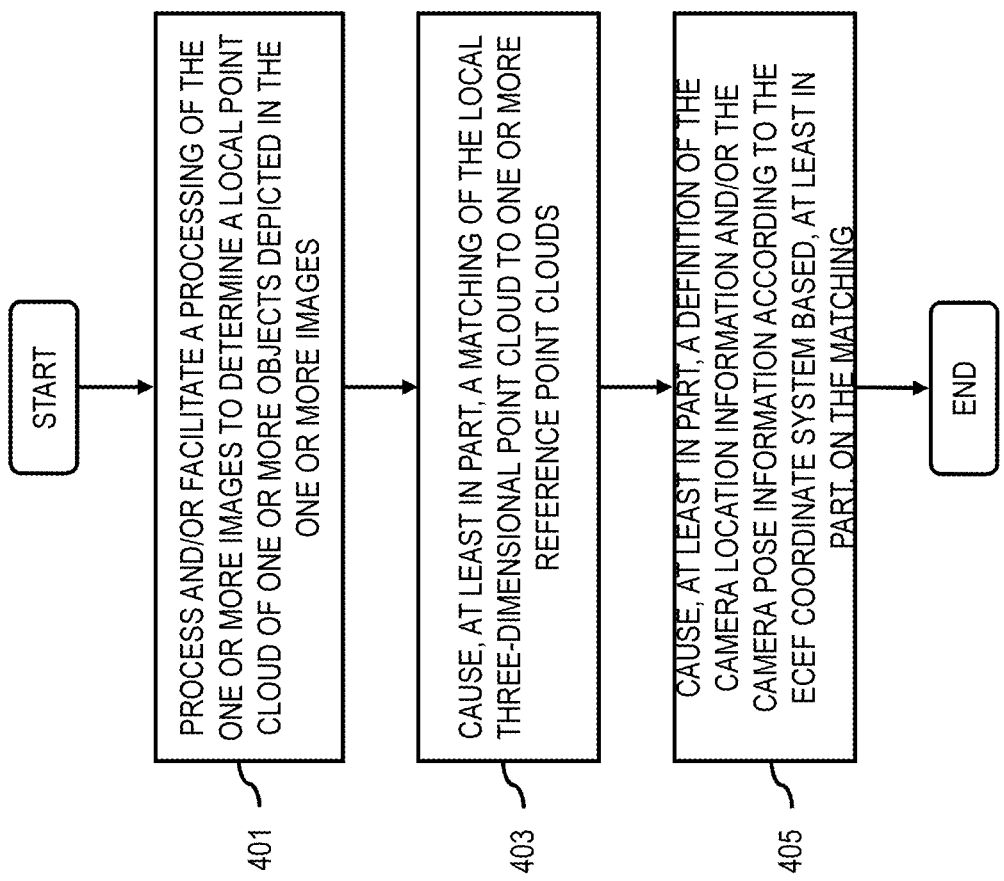

FIG. 4 is a flowchart of a process for defining camera location information and/or the camera pose information according to the global coordinate system based on the matching of the local three-dimensional point cloud to one or more reference point clouds. In one embodiment, the identification platform 109 performs the process 400 and is implemented in, for instance, a chip set including a processor and a memory as shown in FIG. 24.

In step 401, the identification platform 109 processes and/or facilitates a processing of the one or more images to determine a local point cloud of one or more objects depicted in the one or more images.

In step 403, the identification platform 109 causes, at least in part, a matching of the local three-dimensional point cloud to one or more reference point clouds. In one scenario, the identification platform 109 may use standard algorithm for creating a point cloud and then match the point cloud to the existing data to get the coordinate system for image processing, thereby converting 2D images into 3D pictures. In one scenario, there may be two potential matches in the same area, the identification platform 109 may resolve such potential conflict in the matching by using GPS location information, other sensor information, geo tags information etc.

In step 405, the identification platform 109 causes, at least in part, a definition of the camera location information, the camera pose information, or a combination thereof according to the global coordinate system based, at least in part, on the matching.

Figure 5:
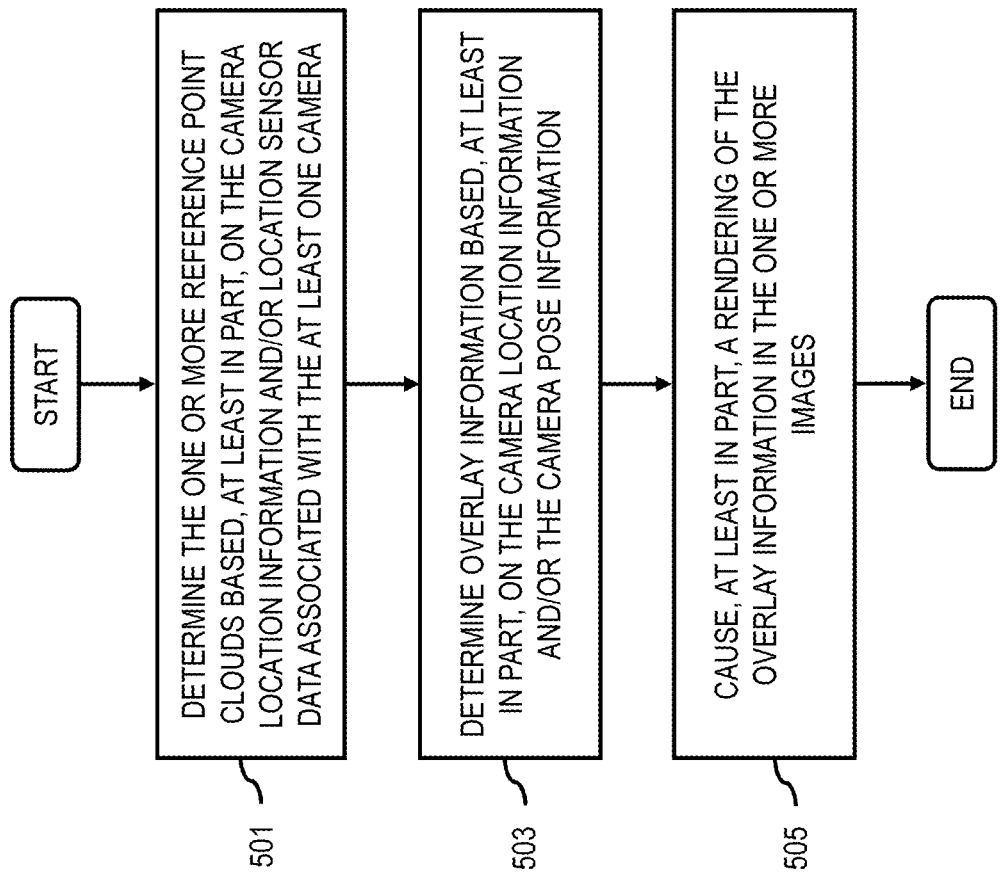

FIG. 5 is a flowchart of a process for determining the one or more reference point clouds and overlay information. In one embodiment, the identification platform 109 performs the process 500 and is implemented in, for instance, a chip set including a processor and a memory as shown in FIG. 24.

In step 501, the identification platform 109 determines the one or more reference point clouds based, at least in part, on the camera location information, location sensor data, or a combination thereof associated with the at least one camera.

In step 503, the identification platform 109 determines overlay information based, at least in part, on the camera location information, the camera pose information, or a combination thereof, wherein the overlay information includes, at least in part, point-of-interest information, social messaging information, location-based service information, or a combination thereof.

In step 505, the identification platform 109 causes, at least in part, a rendering of the overlay information in the one or more images. In one scenario, the videos may be rendered either in the server side or the client side. In one scenario, augmented reality applications may render the augmented content on top of a live viewfinder view from the built-in camera of a device. The placement of the augmented content may be calculated based on the position and orientation of the device, which in turn are estimated from sensor inputs, for instance, GPS, compass, accelerometer, gyroscope etc. By substituting the geocoordinate-tagged video stream for the live viewfinder image and the ECEF-based camera pose for the sensor-derived camera pose, such augmented reality applications may be used to render the same content on top of a geocoordinate-tagged video stream. Instead of a live camera view, augmented reality applications uses previously captured panorama images and 3D models for its rendering. The geocoordinate-tagged video stream substitutes the panorama image and controls the virtual camera pose using the geocoordinate-tagged video data.

Figure 6:
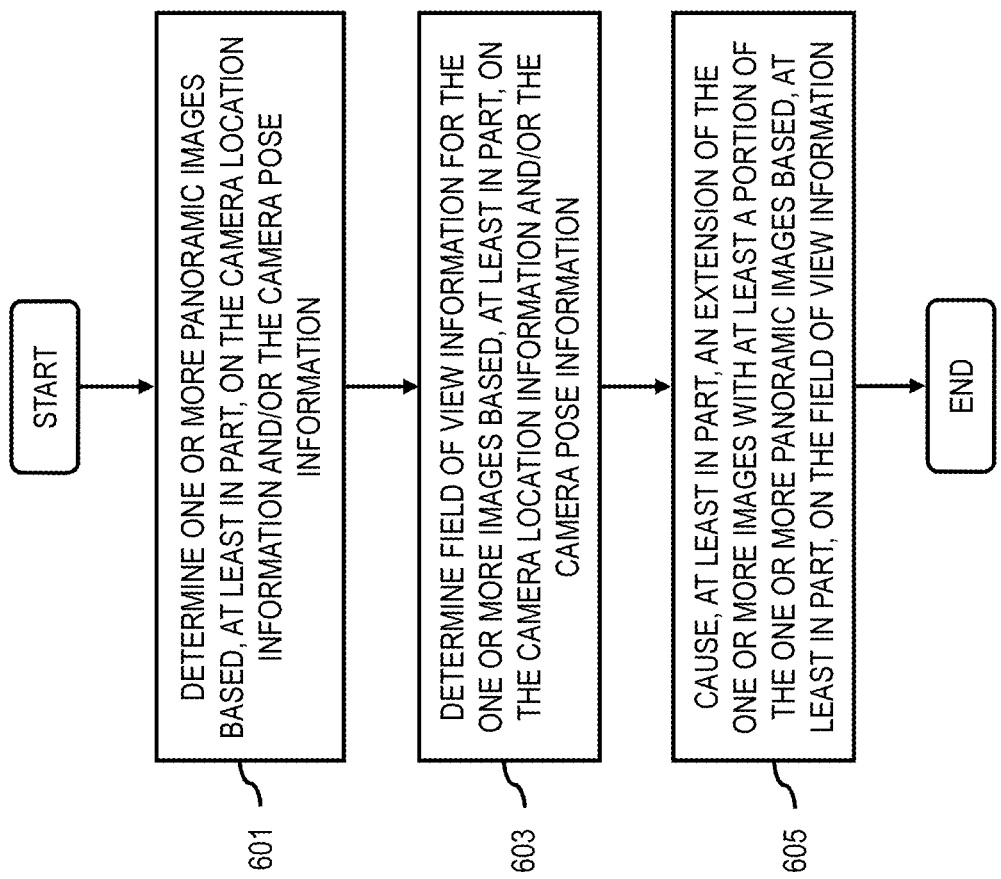

FIG. 6 is a flowchart of a process for determining one or more panoramic images and field of view information for the one or more images. In one embodiment, the identification platform 109 performs the process 600 and is implemented in, for instance, a chip set including a processor and a memory as shown in FIG. 24.

In step 601, the identification platform 109 determines one or more panoramic images based, at least in part, on the camera location information, the camera pose information, or a combination thereof. In one scenario, the identification platform 109 may process one or more images to determine a panoramic view of a captured environment. In one scenario, there may be several images of ABC museum from different users, the identification platform 109 may process these images associated with ABC museum based, at least in part, on camera location information and/or camera pose information, thereby generating a panoramic image for user convenience.

In step 603, the identification platform 109 determines field of view information for the one or more images based, at least in part, on the camera location information, the camera pose information, or a combination thereof. In one scenario, the identification platform 109 may recognize several images associated with POI and may determine the field of view based on the elements extracted from the recognized images. In one scenario, user takes a video of ABC museum from the eastern entrance of the museum, the user may interactively change the field of view to the indoor scenery of ABC museum by using panorama image taken inside the museum by other users.

In step 605, the identification platform 109 causes, at least in part, an extension of the one or more images with at least a portion of the one or more panoramic images based, at least in part, on the field of view information. In one scenario, multiple users may capture images of the same location at different time and from different angles, the identification platform 109 merges the images with the preexisting panorama, thereby providing an expansive POI view.

Figure 7:
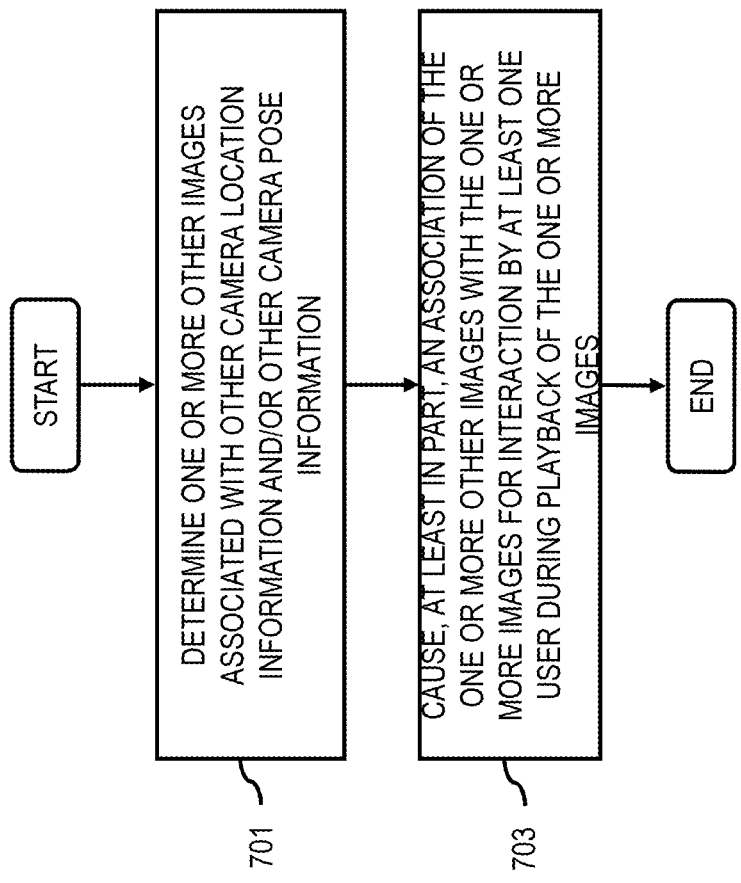

FIG. 7 is a flowchart of a process for determining one or more other images associated with other camera location information and/or other camera pose information, and causing an association. In one embodiment, the identification platform 109 performs the process 700 and is implemented in, for instance, a chip set including a processor and a memory as shown in FIG. 24.

In step 701, the identification platform 109 determines one or more other images associated with other camera location information, other camera pose information, or a combination thereof based, at least in part, on the camera location information, the camera pose information, or a combination. In one scenario, a user may want to visit ABC museum, since one or more images may be tagged with location information, the identification platform 109 may select one or more images associated with ABC museum. The identification platform 109 may further select images based, at least in part, on camera pose information, ensuring that the user gets a display of ABC museum from different angle, thereby allowing user images to be augmented with that of other users.

In step 703, the identification platform 109 causes, at least in part, an association of the one or more other images with the one or more images for interaction by at least one user during playback of the one or more images. In one scenario, a user may want information on ABC museum, the identification platform 109 may guide the user in manipulating one or more images, by providing one or more images in a user interface of at least one UE 101, to capture accurate depiction of ABC museum from different angles. The identification platform 109 may cause an association of the one or more images based, at least in part, on processing of sensor data, querying for information related to the environment depicted in a captured image, transmitted signal from one or more other devices, images captured from one or more other devices, or a combination thereof.

Figure 8:
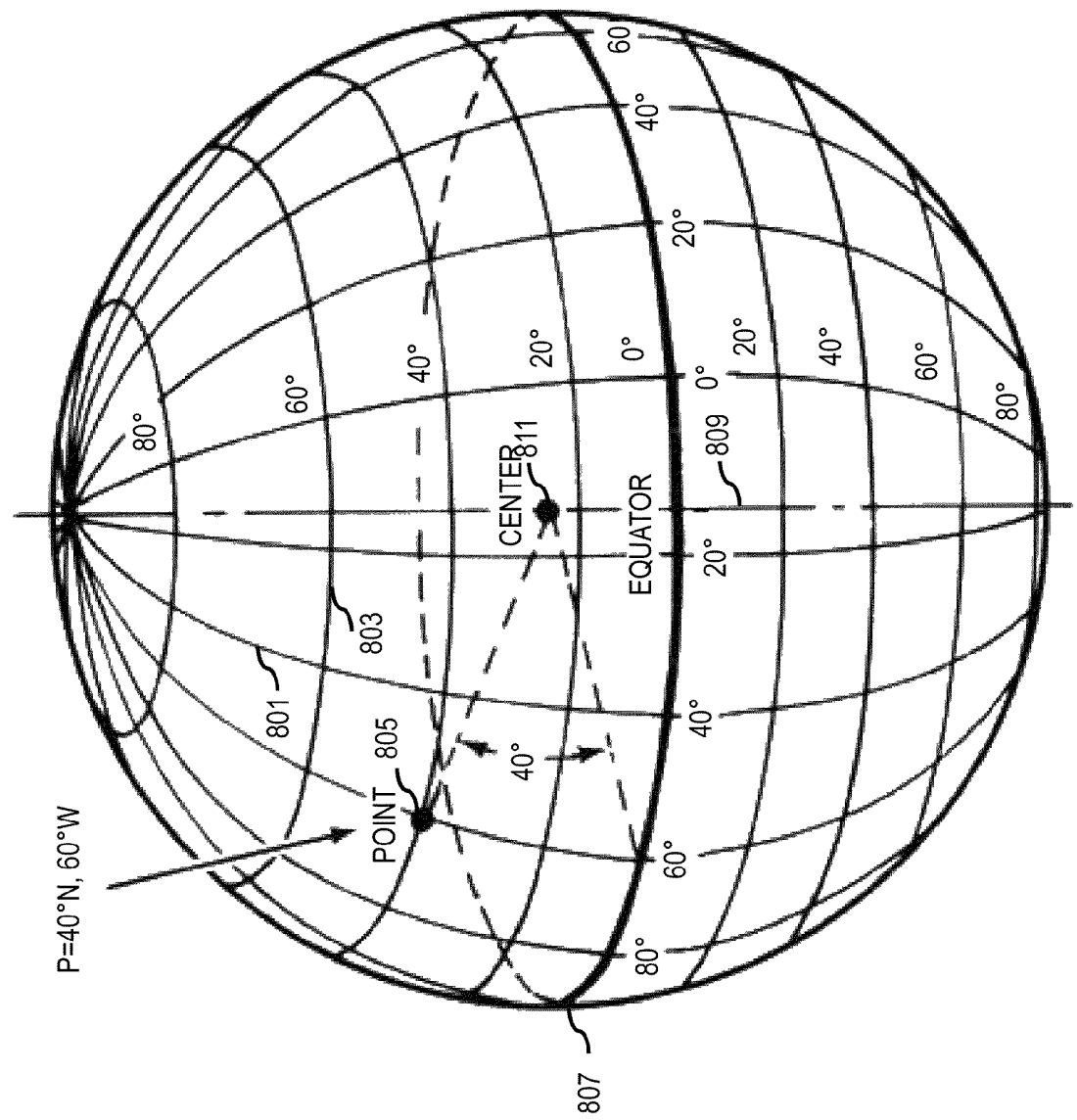
FIG. 8 is a diagram of elliptical model of the earth utilized in the process of FIGS. 3-7, according to one embodiment.

FIG. 8 is a diagram of elliptical model of the earth utilized in the process of FIGS. 3-7, according to one embodiment. The earth surface is often approximated by a spherical model as illustrated in FIG. 8. Latitude (801) and longitude (803) are geographic coordinates that respectively specify the north to south position and east to west position of a point on earth surface. Such two dimensional geographic coordinate system enables every location on earth to be specified by a pair of latitude (801) and longitude (803), for instance, diagram 807 presents an example of a point P (805) (N 40°, W 60°) in a 2D geographic coordinate system (GCS 2D). In one scenario, if the height (809) of a geographic location is of interest, a triple of latitude, longitude and altitude (or elevation) can be used to represent a location that resides below, on or above earth surface, for instance, N 40°, W 60°, H 100 meters, wherein the height is defined as the distance between the point in question and a reference geodetic datum. The choice of the actual reference datum is defined by the geodetic system under consideration. For instance, the commonly used World Geodetic system (WGS 84) uses an elliptical datum surface and Earth Gravitational Model 1996 (EGM 96) geo-id for this purpose.

Figure 9:
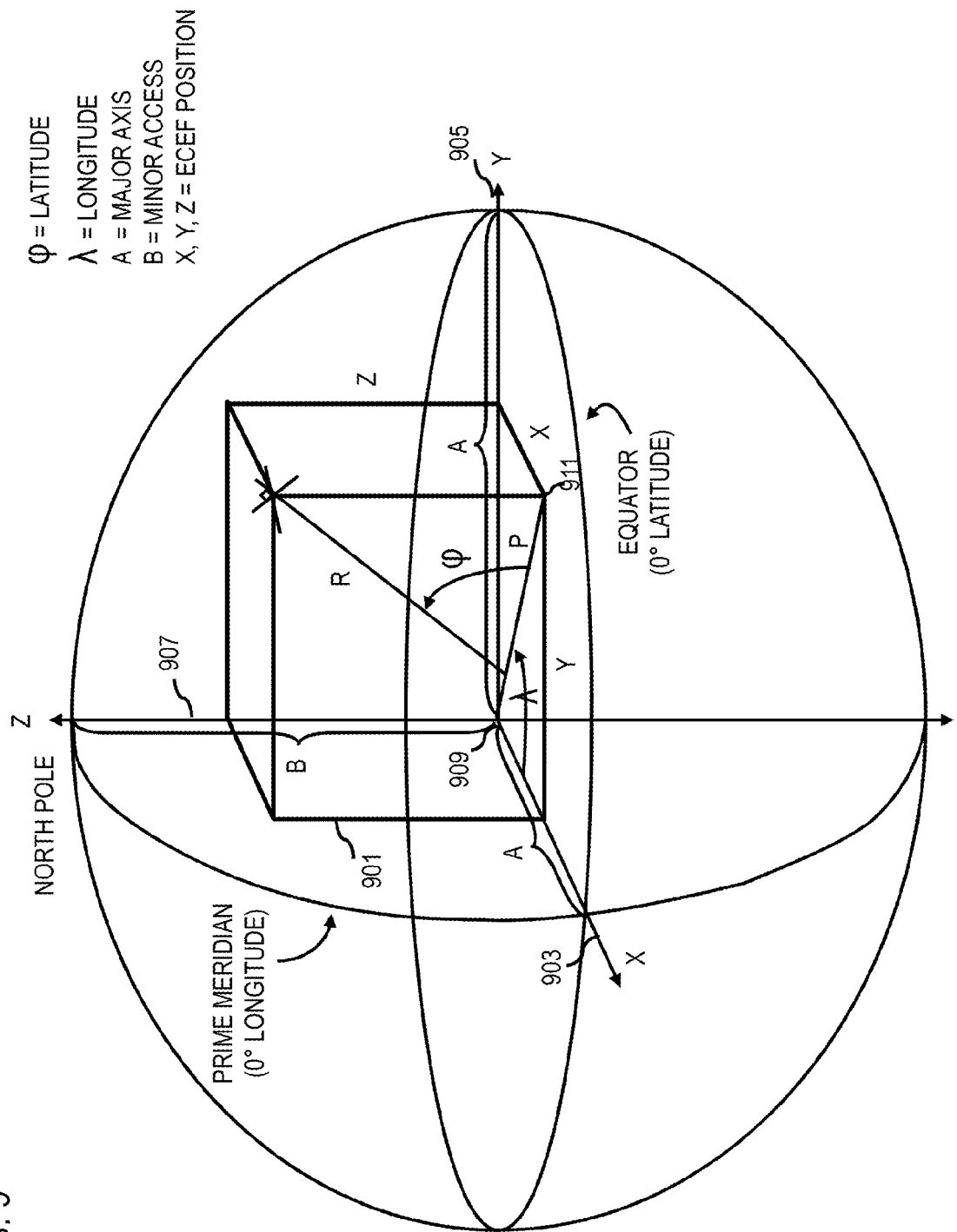
FIG. 9 is a diagram of an earth centered, earth fixed (ECEF) Cartesian coordinate system utilized in the process of FIGS. 3-7, according to one embodiment.

FIG. 9 is a diagram of an earth centered, earth fixed (ECEF) Cartesian coordinate system utilized in the process of FIGS. 3-7, according to one embodiment. A general Cartesian coordinate system for a three dimensional space (901) is uniquely defined by its origin point and three perpendicular axis lines (X (903), Y (905), Z (907)) meeting at the origin O (909). A 3D point P (911) is then specified by a triple of numerical coordinates (Xp, Yp, Zp), which are the signed distances from the point P to the three planes defined by two axes (Y-Z, X-Z, X-Y) respectively. In one scenario, the ECEF Cartesian coordinate system has its origin point (0,0,0) defined as the center of the mass of the earth, its X-axis intersects the sphere of the earth at 0° latitude (equator) and 0° longitude and its Z-axis points towards the north pole, wherein a one to one mapping exists between ECEF and the geo-graphic co-ordination systems.

Figure 10:
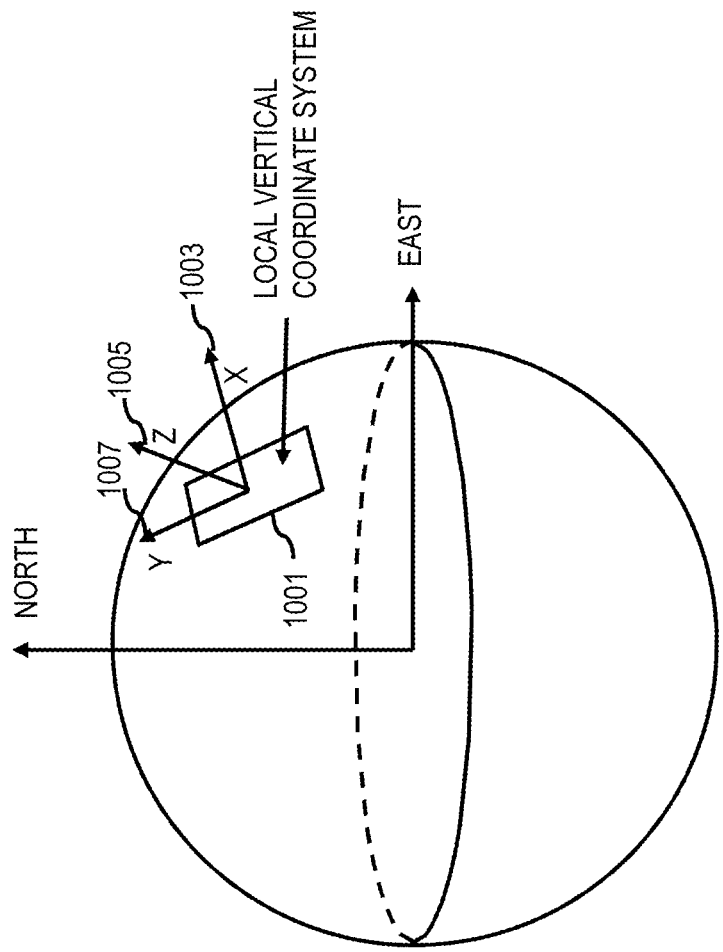
FIG. 10 illustrates a Cartesian coordinate system (CCS) 3D local system with its origin point restricted on earth and three axes (X-Y-Z) utilized in the process of FIGS. 3-7, according to one embodiment.

FIG. 10 illustrates a Cartesian coordinate system (CCS) 3D local system (1001) with its origin point restricted on earth and three axes (X (1003)-Y(1007)-Z(1005)) utilized in the process of FIGS. 3-7, according to one embodiment. A CCS_3D_local system is a Cartesian coordinate system that has its origin point restricted on earth surface. FIG. 10 is a representation of a 3D earth modeling, wherein a CCS_3D_local system is often used to represent a set of 3D geo-augmented data that are near to a reference point on earth, for instance, the 3D geo-augmented data may cover a limited space of 10 km, thereby making the co-ordinate system local. In one scenario, given the origin point and three axes of a CCS_3D_local system, there exists a unique transformation between the CCS_3D_ECEF and the local system in question. If the origin and three axes are unknown, it is difficult to map points in CCS_3D_local to CCS_3D_ECEF system.

Figure 11:
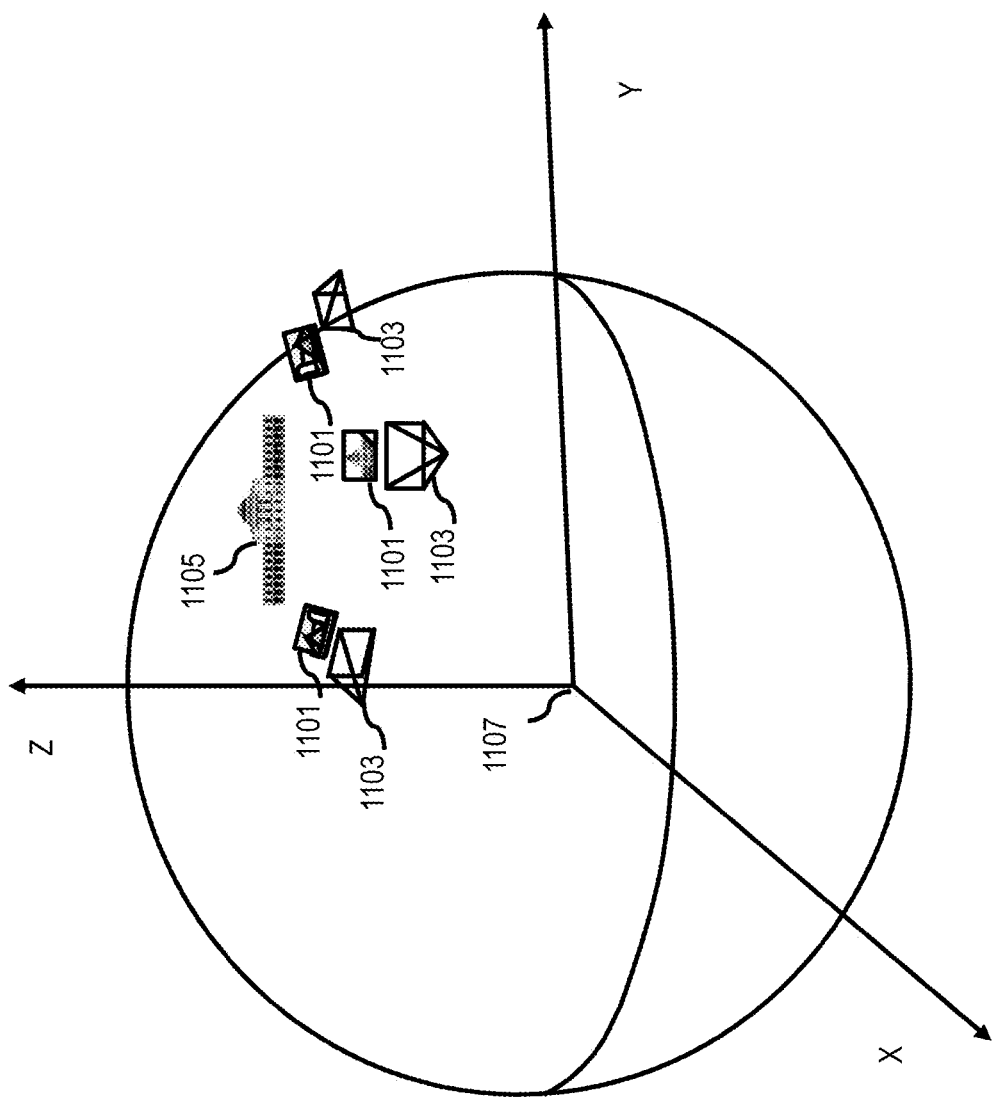
FIG. 11 is a diagram of a geo video data utilized in the process of FIGS. 3-7, according to one embodiment.

FIG. 11 is a diagram of a geo video data utilized in the process of FIGS. 3-7, according to one embodiment. In one embodiment, a complete geo video data, may consist of four items: 1) video frames (1101), 2) camera pose (1103), 3) a set of 3D points that are viewable from one or more multiple video frames (1105), and 4) an ECEF Cartesian coordinate system in which the three data items are defined (1107).

Figure 12:
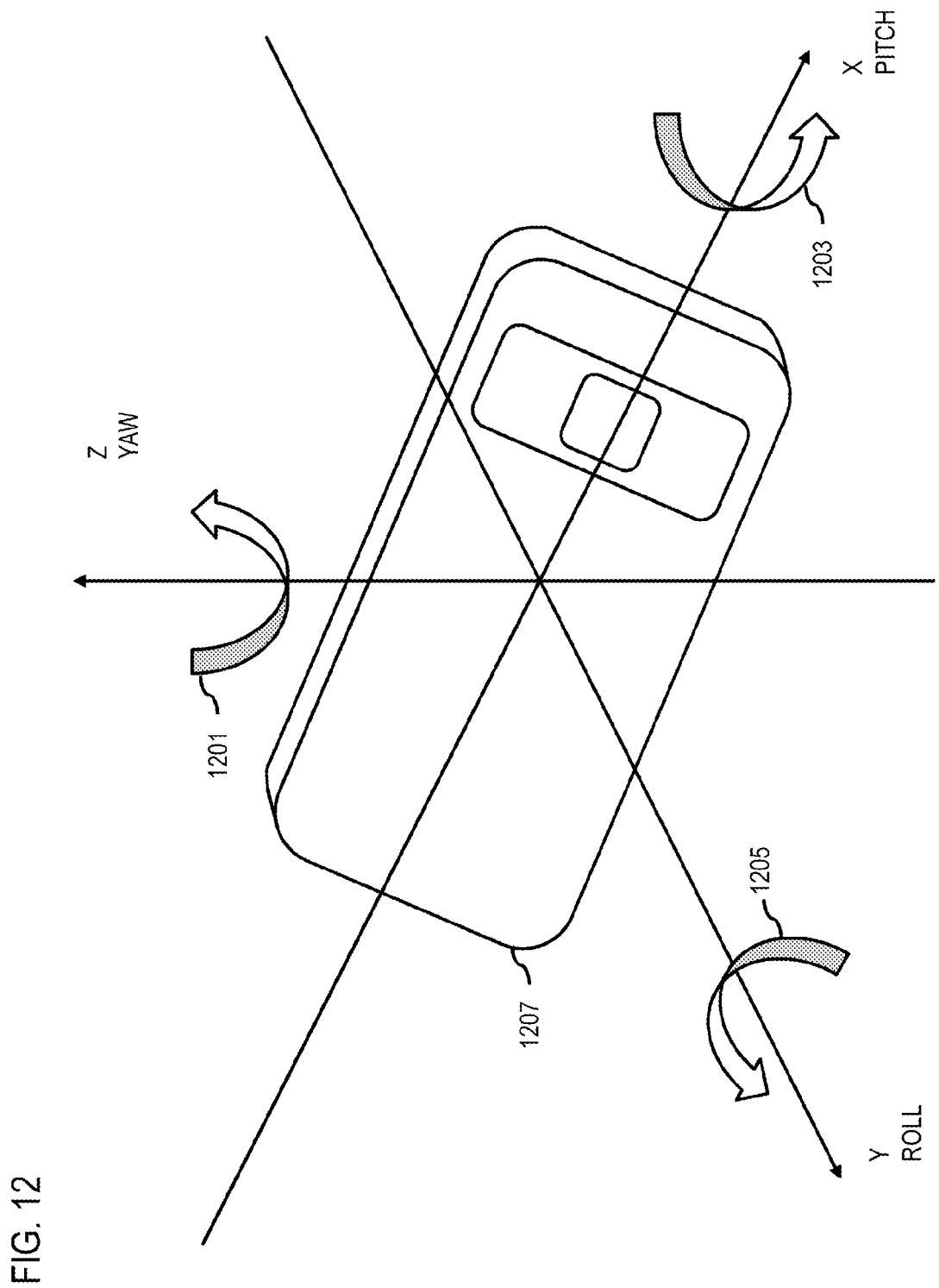
FIG. 12 is a diagram of a camera orientation in a 3D space utilized in the process of FIGS. 3-7, according to one embodiment.

FIG. 12 is a diagram of a camera orientation in a 3D space utilized in the process of FIGS. 3-7, according to one embodiment. Here, Yaw (1201) is a counterclockwise rotation along the z axis, Pitch (1203) is a counterclockwise rotation along the y axis, and roll (1205) is a counterclockwise rotation along the x axis. In one scenario, the video frames are often regarded as a sequence of still images that are captured (or displayed) at different time at varying camera locations. In one scenario, the camera pose of associated videos frames represent 3D locations and orientations of the video-capturing-camera at the time when the video frames were recorded. The camera locations can be simply described as $X_L$, $Y_L$, $Z_L$. The orientation can be described as roll, yaw and pitch angles of rotating the camera from a reference placement to its current placement. Further, the orientation can be represented by rotation matrices or quaternions, which are mathematically equivalent to Euler angles. With the camera location and orientation, one can define the camera movement with six degrees of freedom (6 DoF) in a coordinate system.

Figure 13:
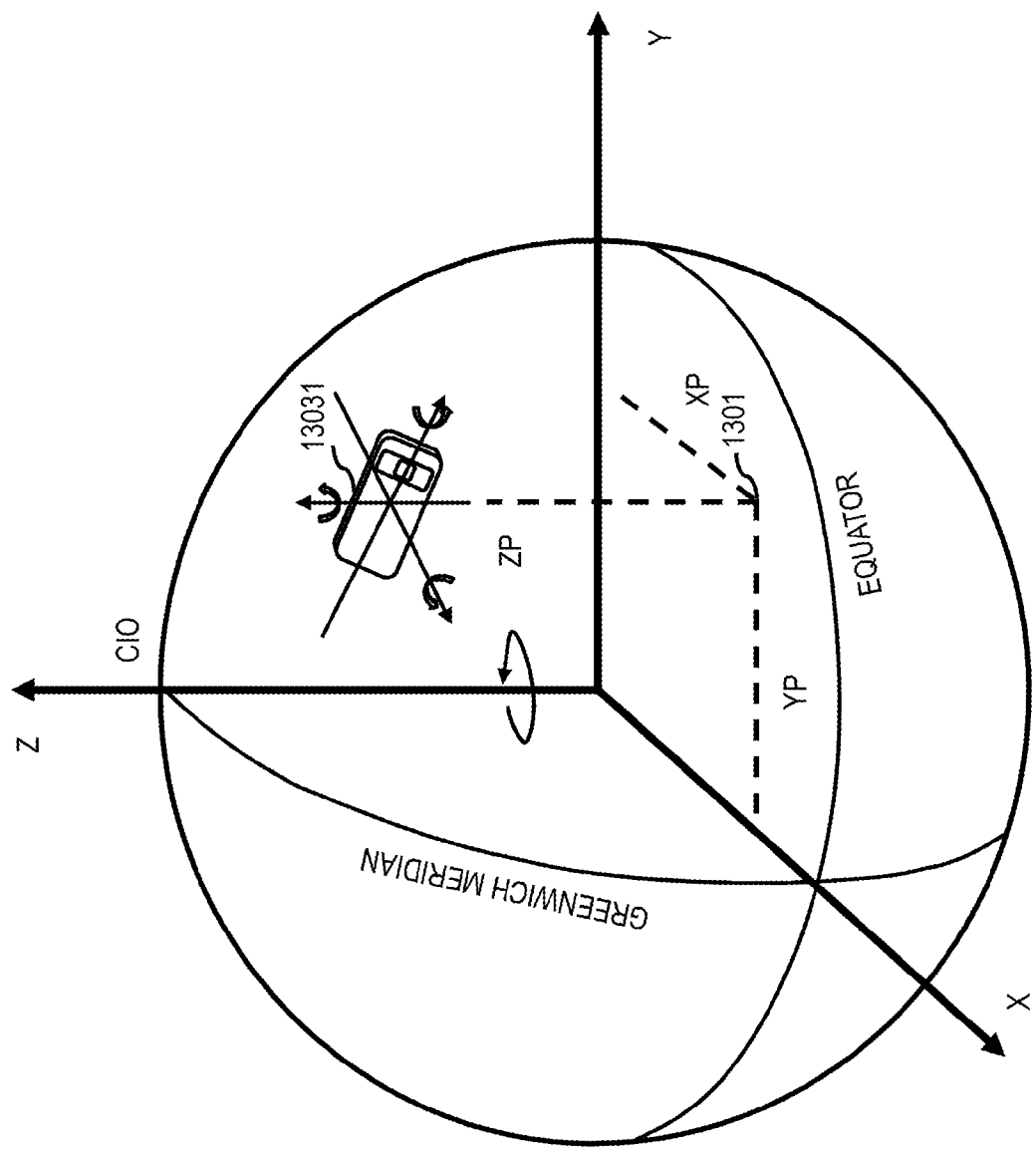
FIG. 13 is a diagram of a camera pose in CCS_3D_ECEF utilized in the process of FIGS. 3-7, according to one embodiment.

FIG. 13 illustrates an example of a camera pose in CCS_3D_ECEF utilized in the process of FIGS. 3-7, according to one embodiment. In one scenario, a point cloud is a set of 3D points that are viewable from one or more multiple video frames, when viewed from a given camera pose (1301), 3D points are projected, according to proper camera models, onto the 2D image and gives rise to color intensities at different pixel locations (1303). In the context of Earth modeling, 3D point clouds can be directly measured by Light Detection and Ranging (LIDAR) technology. Alternatively, 3D point clouds can be reconstructed from input video frames by using computer vision Structure-From-Motion (SFM) technology. Within CCS_3D_ECEF, 3D point clouds as well as camera poses needs to be accurately defined:

(1) When a CCS_3D_ECEF is used, the camera poses and the point clouds are globally defined.

(2) If a CCS_3D_Local system with known origin and axes is used, the camera poses and point clouds can be uniquely mapped to the CCS_3D_ECEF. By doing this, the camera pose is also defined in a global coordinate system. Besides, if a CCS_3D_Local system with unknown origin and axes is used, camera poses and point clouds can only be defined within the local coordinate system, because of the difficulty to map point-clouds and camera poses into CCS_3D_ECEF.

Figure 14:
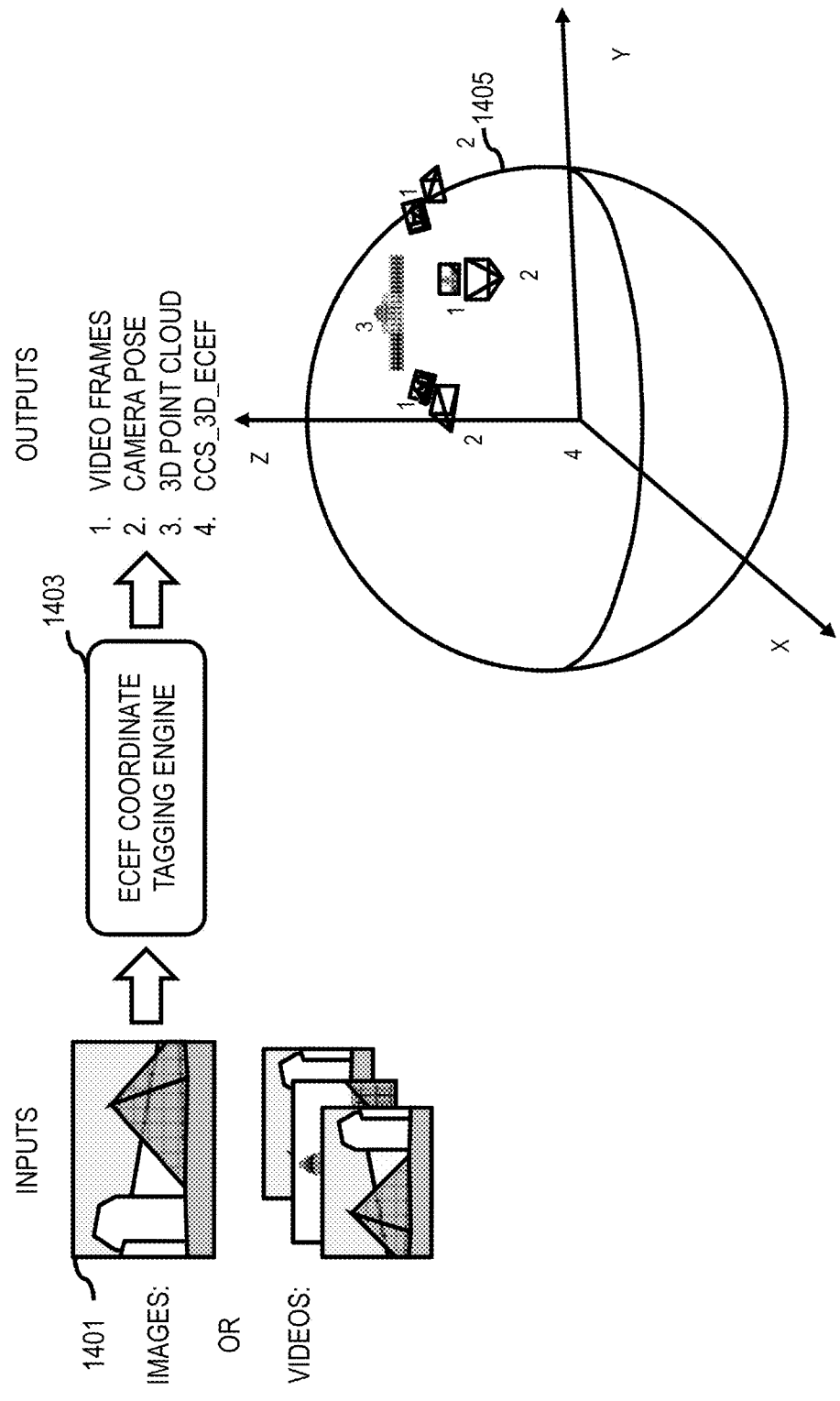
FIGS. 14-22 are diagrams of user interfaces utilized in the processes of FIGS. 3-7, according to various embodiments.

FIG. 14 is a diagram of user interface utilized in the process of FIGS. 3-7, according to various embodiments. FIG. 14 illustrates a general overview of the inputs and outputs of the ECEF coordinate tagging engine, wherein the engine extracts accurate geo-location metadata from input data. The input to the ECEF coordinate tagging engine can be either a collection of images or a sequence of video frames (1401). After processing, the engine outputs a set of geo-location metadata, including registered video frames, corresponding camera poses and reconstructed 3D point clouds (1403). All these data are defined within a CCS_3D_Local system with known origin and axes (1405). Therefore, camera poses and point clouds can be uniquely mapped to the CCS_3D_ECEF.

Figure 15:
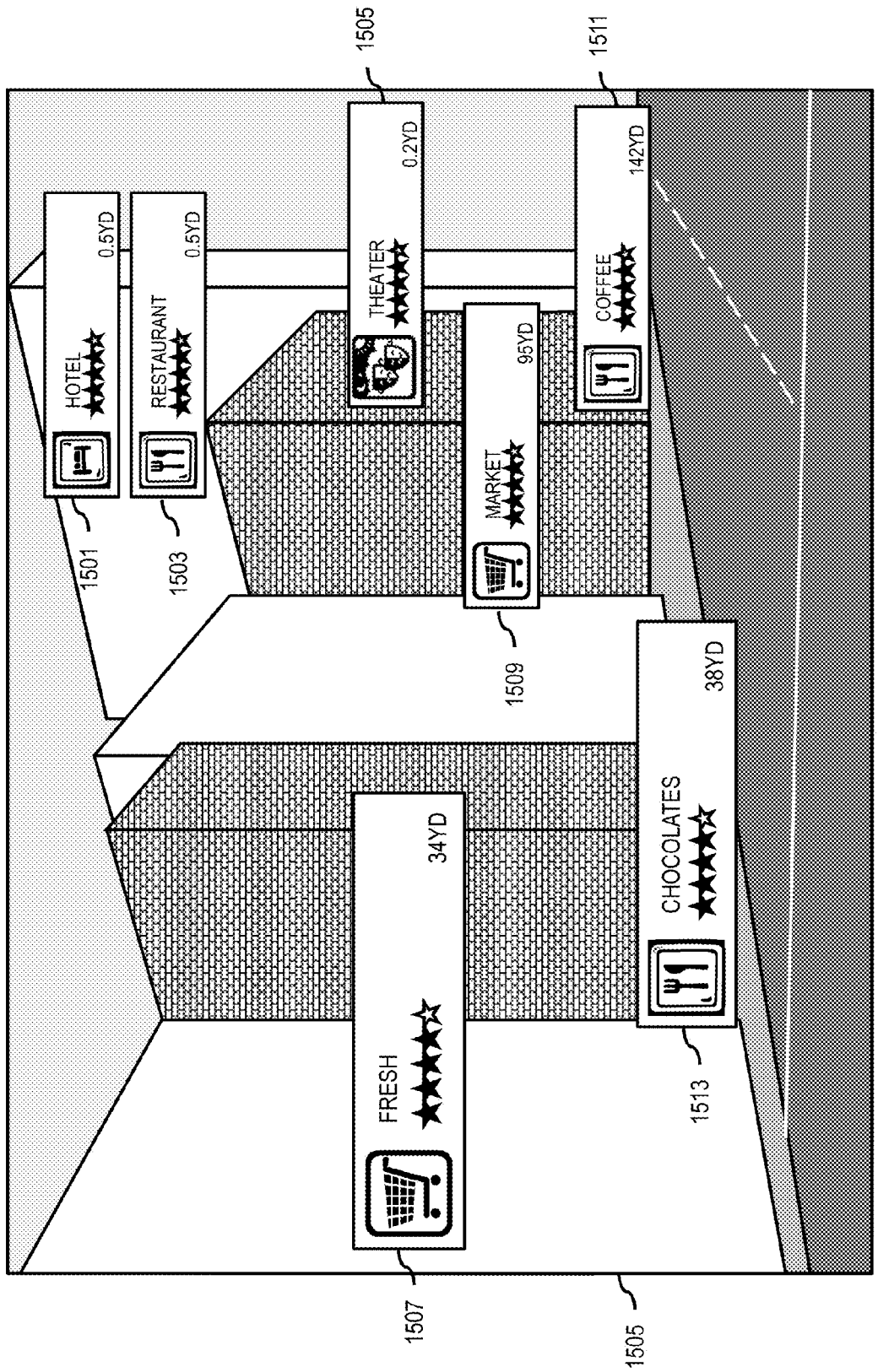

FIG. 15 is a diagram of user interface utilized in the process of FIGS. 3-7, according to various embodiments. FIG. 15 illustrates an example of the augmented video with POIs superimposed on video frames. In one scenario, based on POIs and associated geo metadata, it is possible to augment a geocoordinate-tagged video with nearby POIs data (1505). During the playback of a geocoordinate-tagged video, the change of camera poses gives rise to corresponding change in the rendered POI data, thus creating augmented-reality experience. The rendering of POIs may be associated with the playback of a recorded geocoordinate-tagged video, instead of the on-site camera viewfinder images. In one scenario, Peter visits XYZ shopping mall, and takes a video of the mall. Upon uploading the video, he would get a video with added POI information, for instance, the hotel (1501), the restaurant (1503), the theatre (1505), the market (1509) etc., within XYZ shopping mall, with reviews and distance information adhered to the display.

Figure 16:
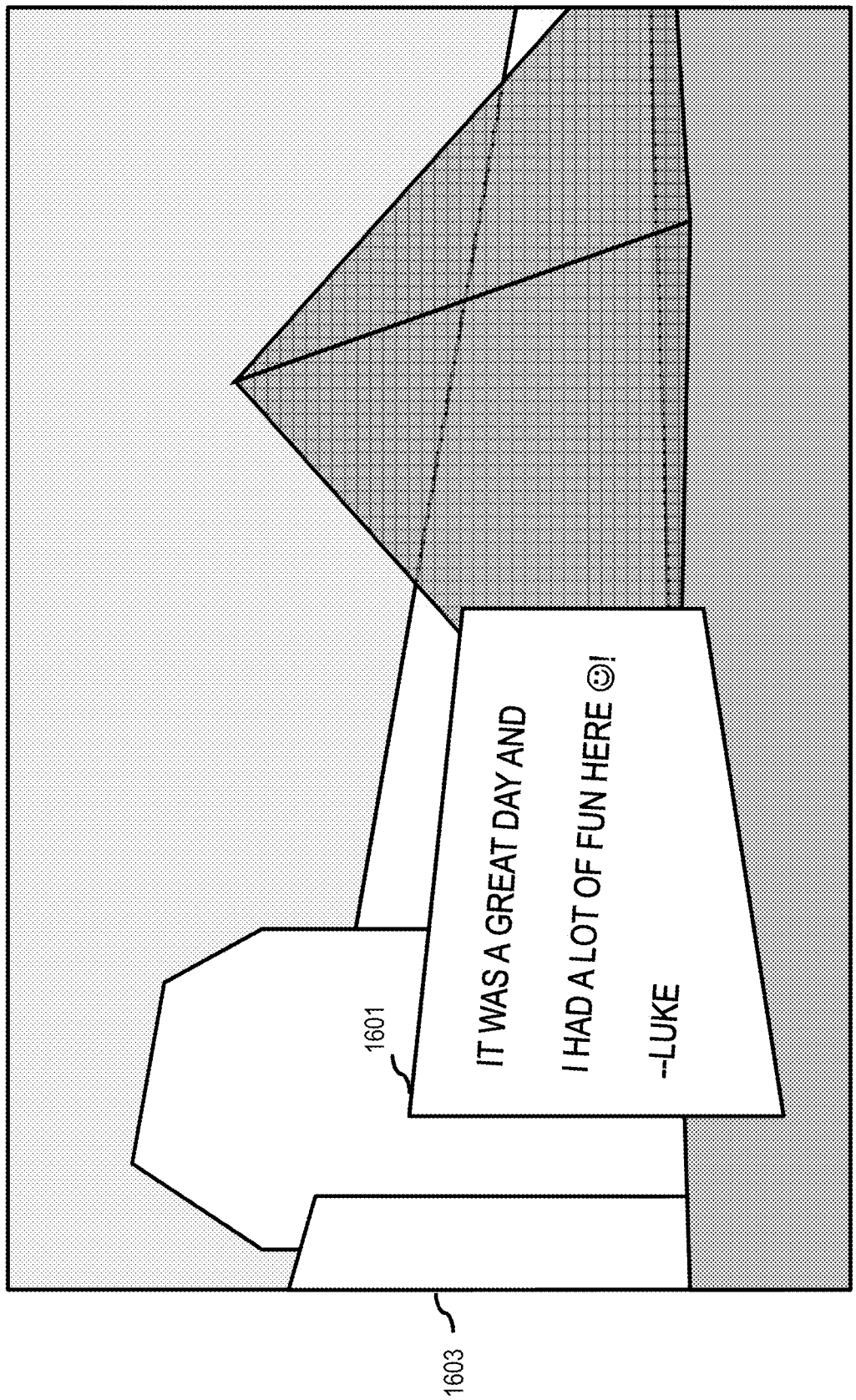

FIG. 16 is a diagram of user interface utilized in the process of FIGS. 3-7, according to various embodiments. FIG. 16 presents an example of a social virtual board in a video frame. In one scenario, social aspect of geocoordinate-tagged videos is a unique feature that allows sharing of a geocoordinate-tagged video (and POIs) among friends or people of interest. In one scenario, certain virtual objects, for instance, a virtual board, may be rendered accordingly during the playback of a geocoordinate-tagged video (1603). Such a virtual board can be used to leave comments among friends. In one scenario, Mike goes to Paris, visits a museum, and takes a video. After he uploads the video together with his comments of the trip, he would get a video with added virtual social board where his feeling of the trip is added (1601). If Mike shows the video to his friends, they can see Mike's comments about the trip and also leave their comments on the board. Further, the augmented video is rendered with the calculated camera pose for each image, instead of rough sensor data, resulting in more accurate rendering.

Figure 17:
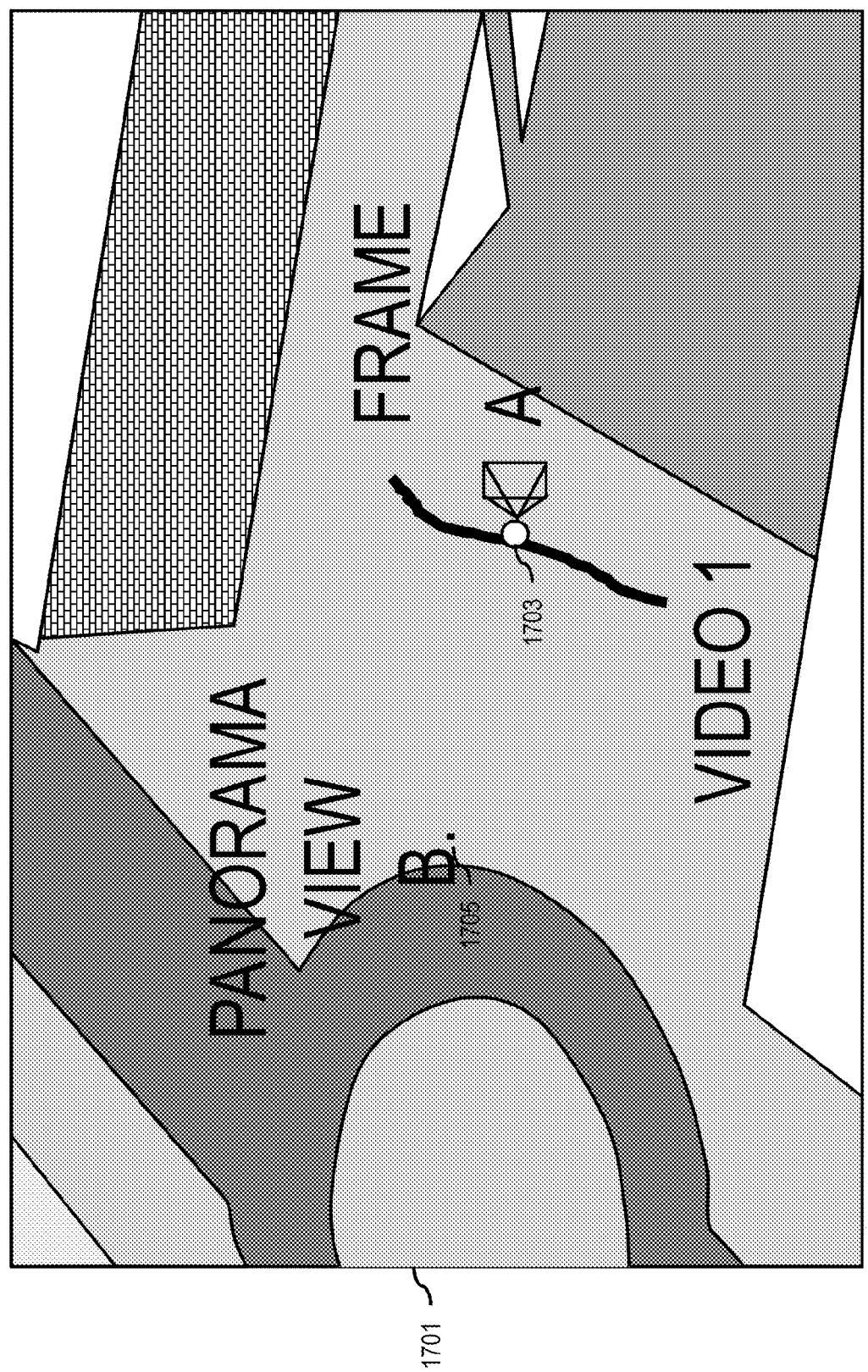

FIG. 17 is a diagram of user interface utilized in the process of FIGS. 3-7, according to various embodiments. FIG. 17 presents an example of switching from a video frame A to the panorama view B during the playback of the video 1. In one scenario, panorama images are often tagged with GPS information (i.e. latitude and longitude in GCS_2D). Based on panorama image geo-location information, it is possible to augment geocoordinate-tagged video with nearby panorama images. During the playback of a geocoordinate-tagged video, the field of view (FOV) of every video frame can be extended to 360° by using nearby panorama images (1701). In one scenario, the FOV of frame A is limited to the entry of ABC museum (1703). Therefore, the viewers may interactively change the FOV to the opposite side by using panorama image taken at position B (1705).

Figure 18:
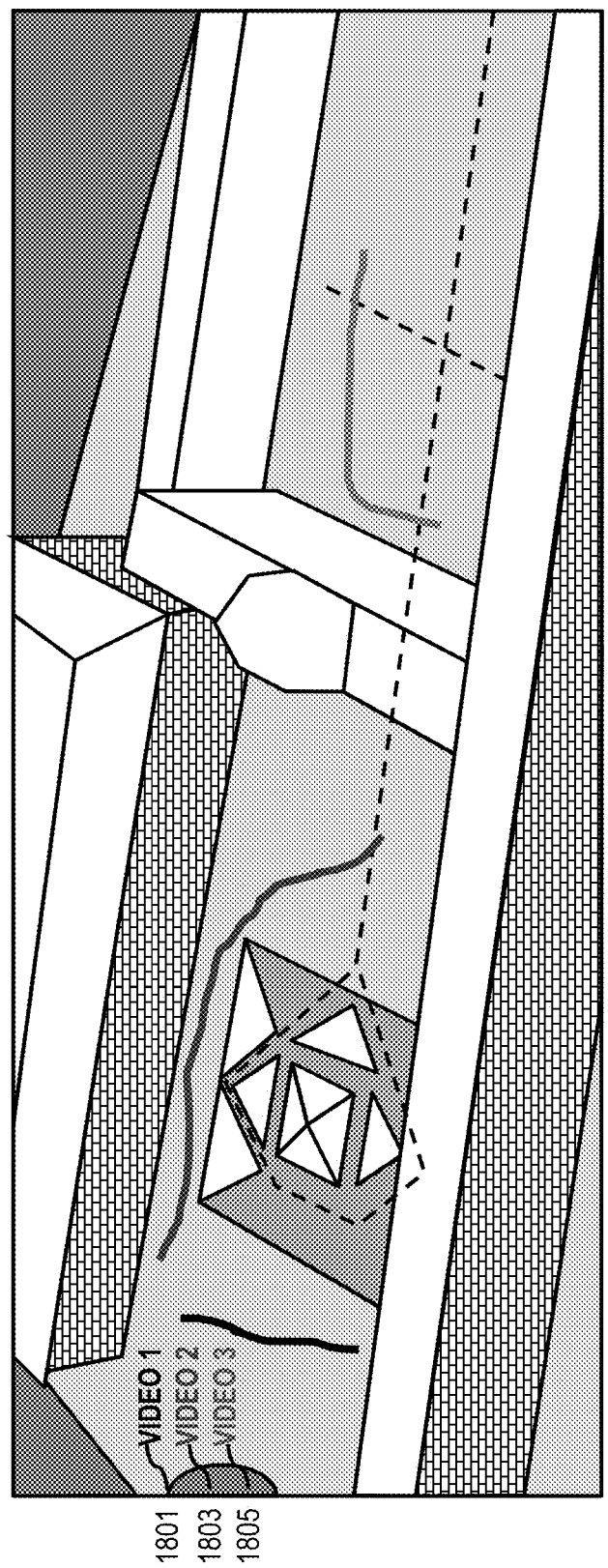

FIG. 18 is a diagram of user interface utilized in the process of FIGS. 3-7, according to various embodiments. FIG. 18 presents an illustration whereby three videos (1801, 1803, 1805) are taken by three different users at different time and locations of POI. Since all geocoordinate-tagged video data can be reconstructed within the CCS_3D_ECEF system, it is possible to integrate nearby geocoordinate-tagged videos that are shot at different locations, time and by different people. During the playback of a geocoordinate-tagged video, the viewer may choose to switch from the current geocoordinate-tagged video to a nearby geocoordinate-tagged video. Both the path and the angle of the viewing camera can be interactively controlled by the viewer. In one scenario, there may be three videos with different capturing-camera-paths around ABC museum. During the playback of the "video 2" (1803), the user may choose to view frames from "video 1" (1801) or "video 3" (1805).

Figure 19A:
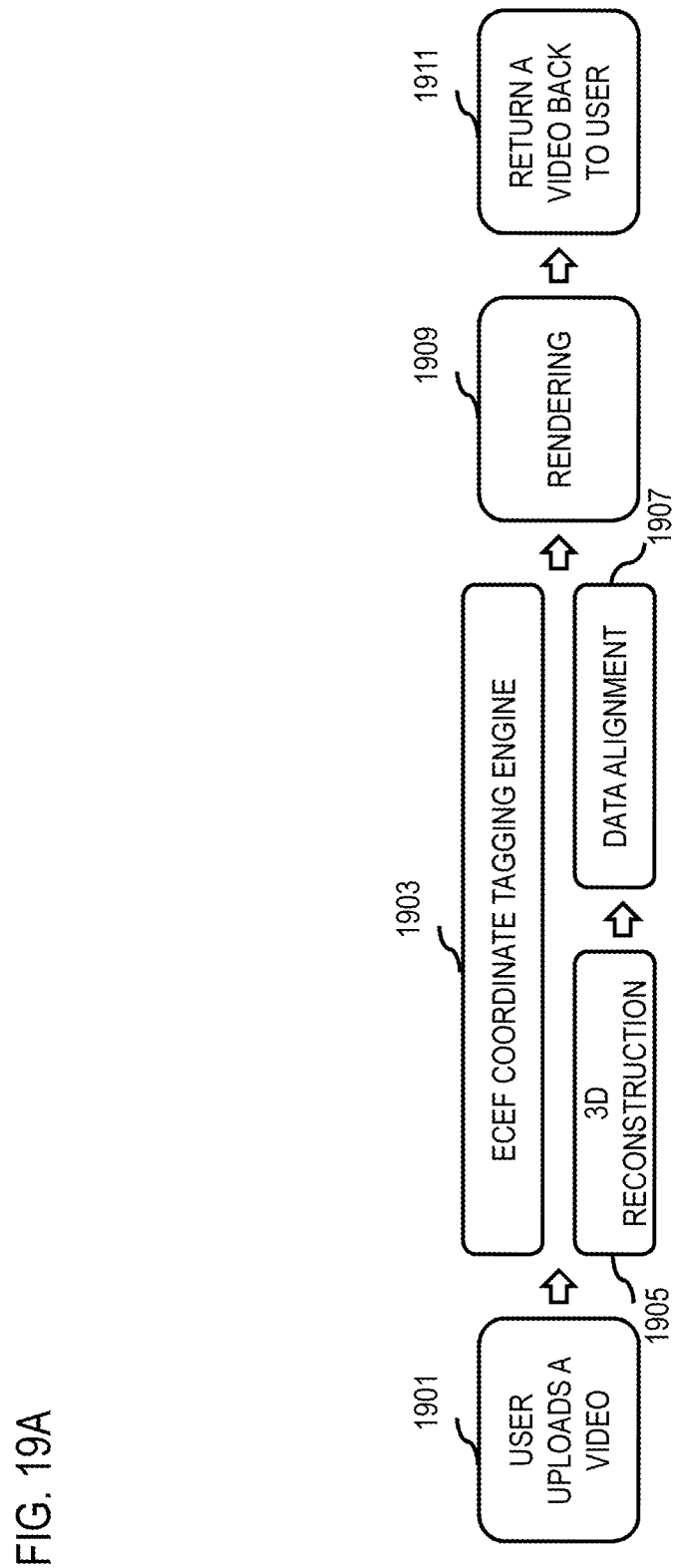

FIG. 19A is a diagram of user interface utilized in the process of FIGS. 3-7, according to various embodiments. FIG. 19A shows the pipeline of processing of images to determine camera location information and/or camera pose information associated with at least one camera capturing the one or more images. In one scenario, a user takes a video with his UE 101, the video is automatically uploaded to the ECEF coordinate tagging engine (1901), and then the ECEF coordinate tagging engine generates the geocoordinate-tagged video data (1903). Then, the video is rendered and returned to the user (1909 and 1911).

Figure 19B:
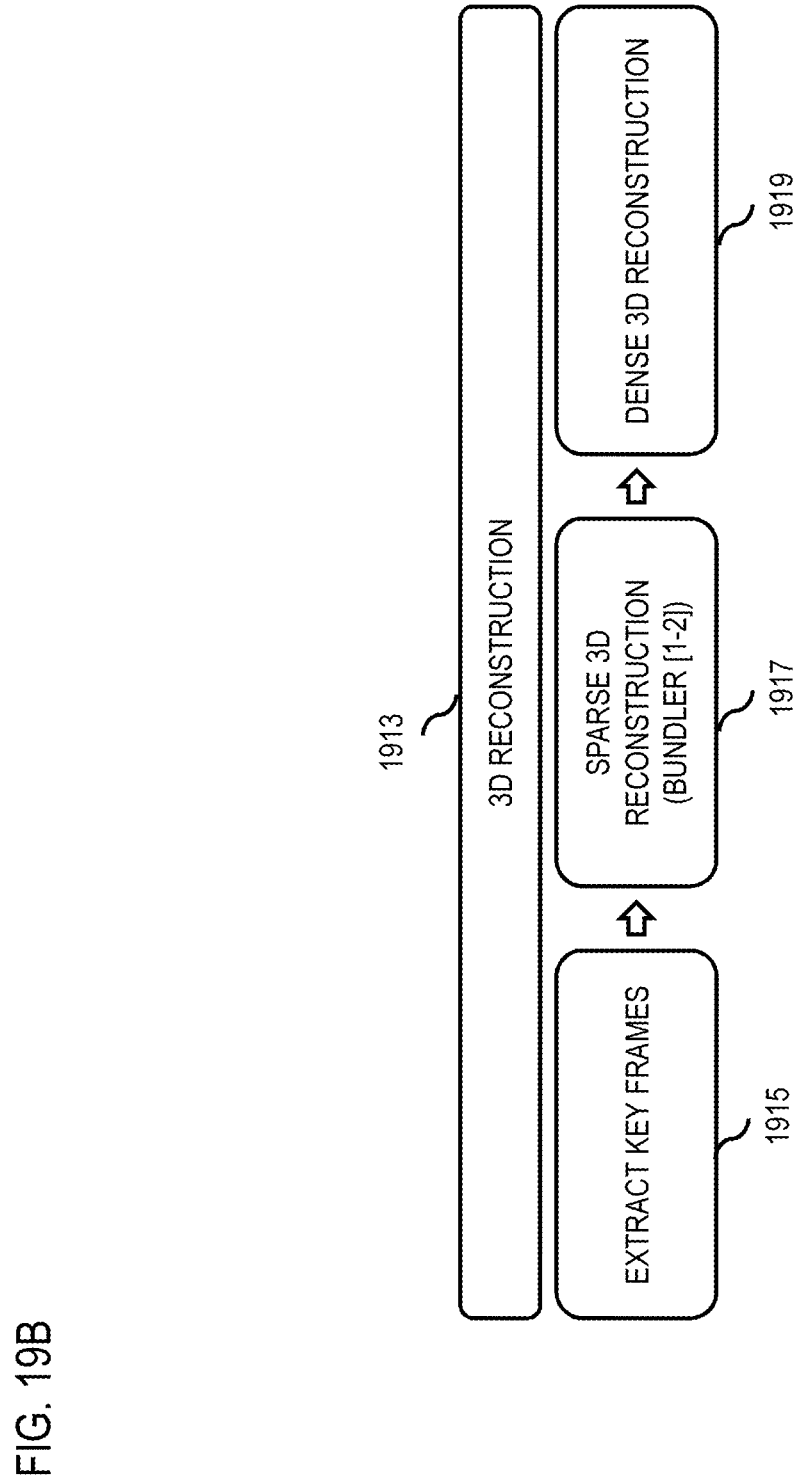

FIG. 19B is a diagram of user interface utilized in the process of FIGS. 3-7, according to various embodiments. FIG. 19B presents the three steps in the 3D reconstruction (1913). The invented ECEF coordinate tagging engine involves two important data-processing components, namely, 3D reconstruction (1905) and data alignment (1907). In one scenario, once a video clip is uploaded, ECEF coordinate tagging engine extracts the key frames (1915), reconstructs the scene as the 3D point cloud (1917) and recovers camera poses within a CCS_3D_Local system (1919).

Figure 20:
Figure 21:
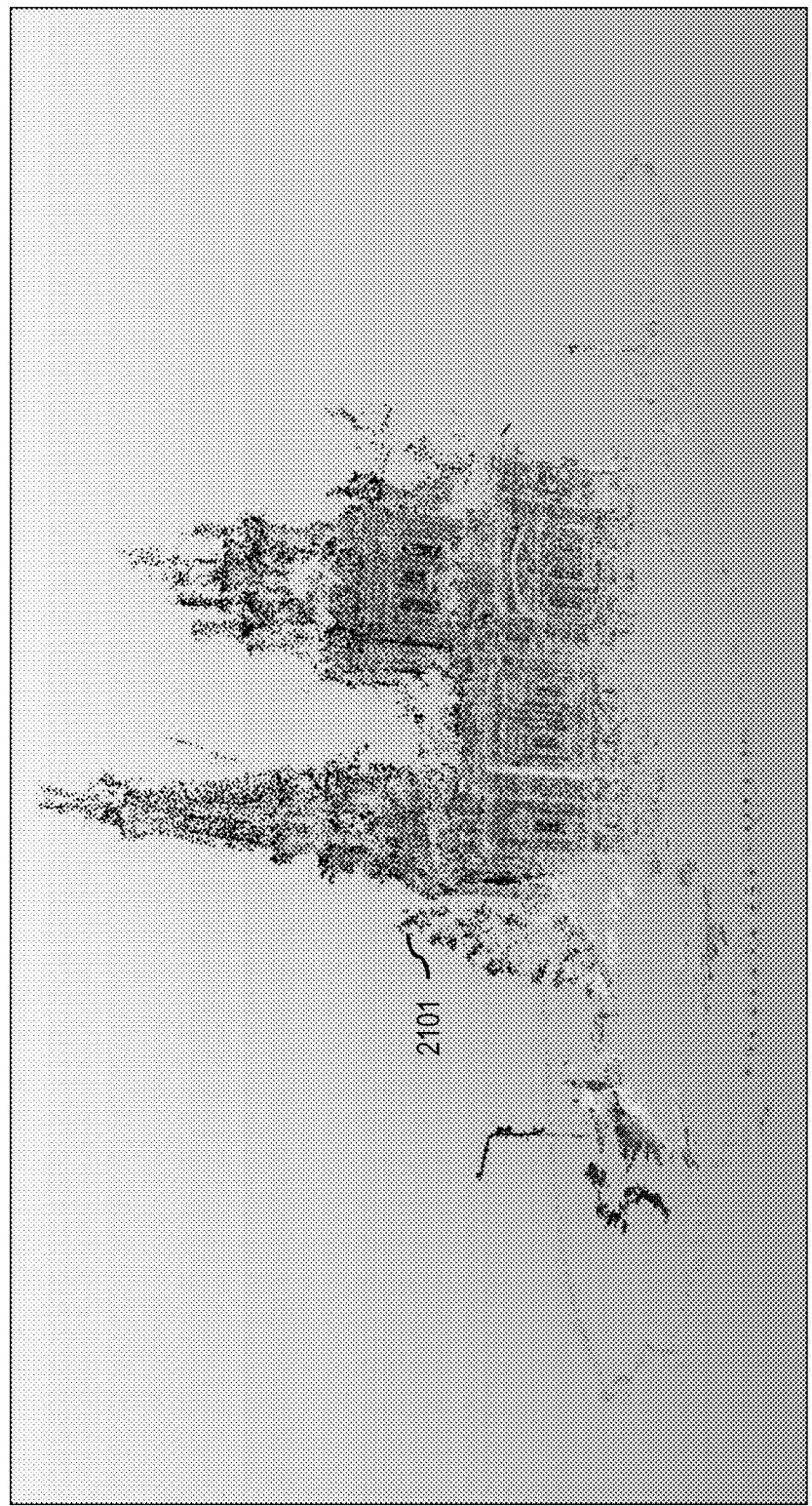

FIG. 20 is a diagram of user interface utilized in the process of FIGS. 3-7, according to various embodiments. FIGS. 20 and 21 are examples of reconstruction results, which consist of 3D point clouds for a location destination, for instance, ABC museum, and corresponding camera poses for each video frames. In one scenario, FIG. 20 presents an example of the reconstructed 3D point cloud (2001) for ABC museum and the corresponding local camera poses (2003).

In one scenario, to better visualize the camera poses, camera poses of every 60 frames may be plotted.

FIG. 21 is a diagram of user interface utilized in the process of FIGS. 3-7, according to various embodiments. FIG. 21 shows the same reconstructed 3D point cloud as those in FIG. 20, but the point cloud is shown with additional attributes, such as, color information whereby the centers of cameras may be denoted with colors (2101) for user convenience.

Figure 22:
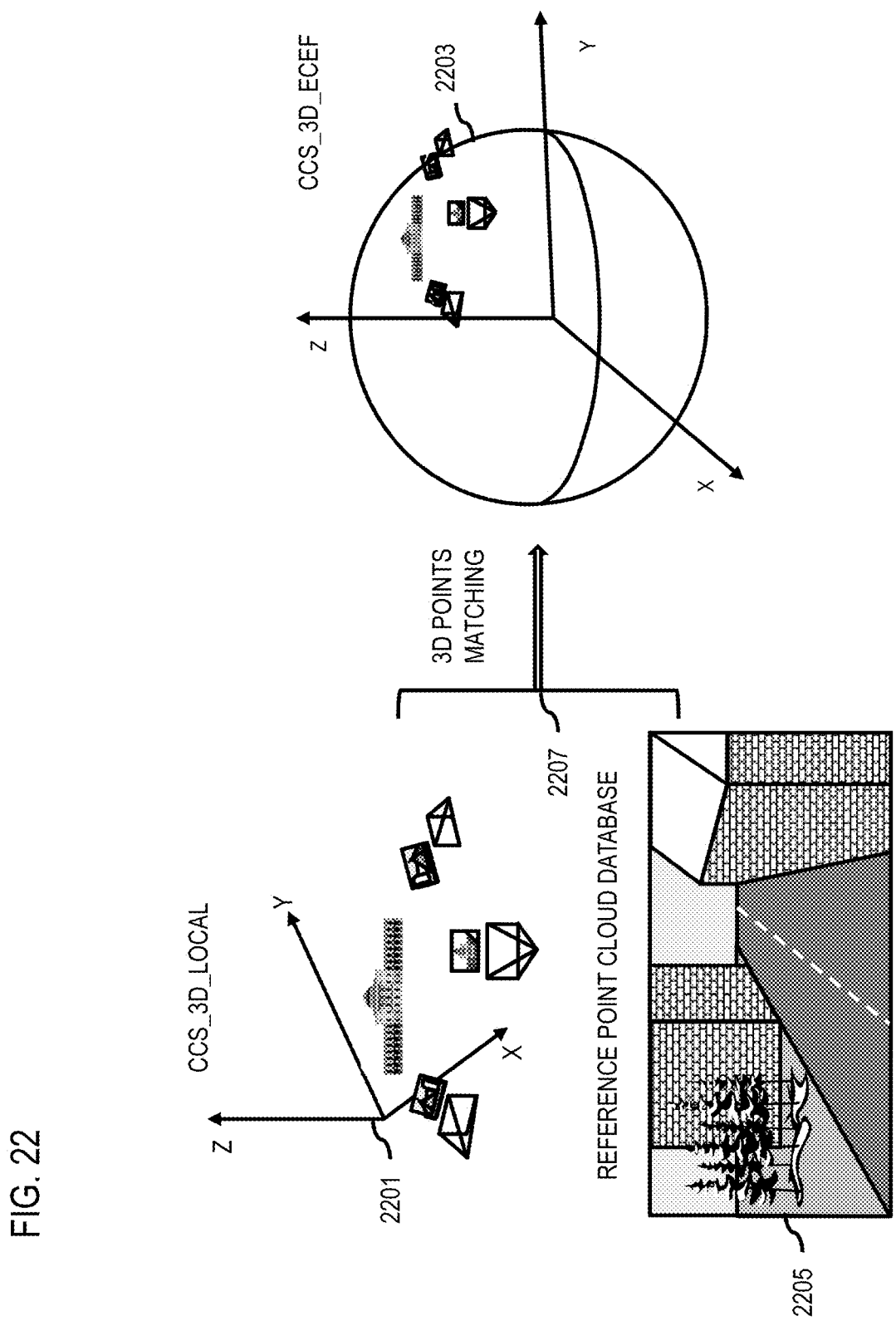

FIG. 22 is a diagram of user interface utilized in the process of FIGS. 3-7, according to various embodiments. FIG. 22 presents an example that is capable of establishing correspondence between CCS_3D_Local system (2201) and the CCS_3D_ECEF system (2203) with the help of reference point cloud data (e.g., the NAVTEQ True data) (2205) and point cloud matching technique (2207), and then represent the geocoordinate-tagged video data in CCS_3D_ECEF system. Since reconstructed point clouds from the previous step are only defined within a CCS_3D_Local system, this processing step establishes correspondences between the CCS_3D_Local system and the CCS_3D_ECEF system. In one scenario, the system can firstly use GPS data to roughly locate the area of the 3D point cloud, then take advantage of reference point cloud databases (e.g., NAVTEQ True Data) and adopt 3D point cloud matching techniques to find the exact correspondences between CCS_3D_Local system and the CCS_3D_ECEF system. By doing so, all the camera poses and 3D point cloud can be defined in CCS_3D_ECEF system. In one scenario, the identification platform 109 may mark point cloud data for augmenting the NAVTEQ database, if it cannot match the point cloud data to the NAVTEQ database.

The processes described herein for processing one or more images to determine camera location information and/or camera pose information, wherein these information are represented according to a global coordinate system, thereby causing, at least in part, an association of these information with the one or more images as meta-data information may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 23:
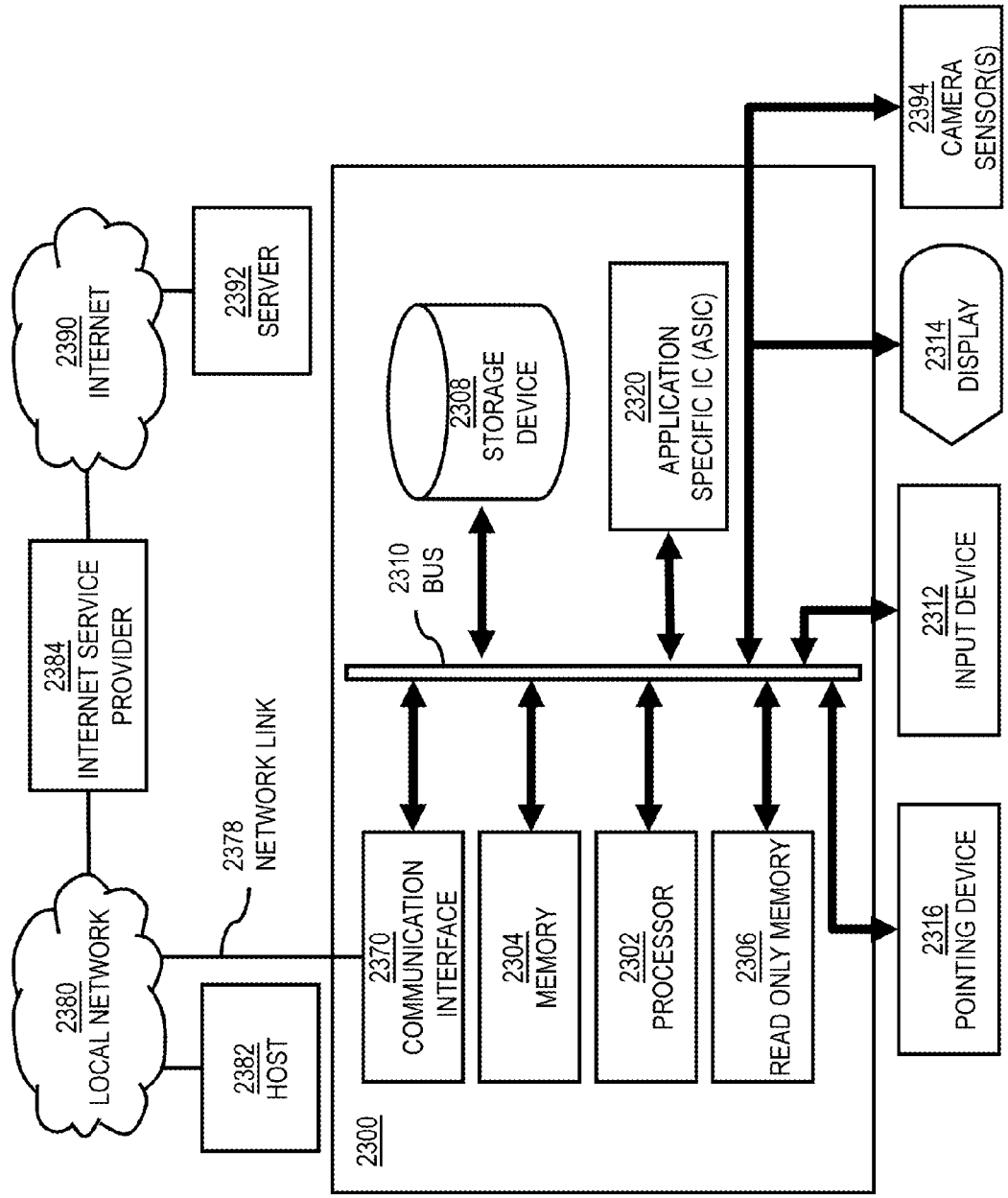
FIG. 23 is a diagram of hardware that can be used to implement an embodiment of the invention.

FIG. 23 illustrates a computer system 2300 upon which an embodiment of the invention may be implemented. Although computer system 2300 is depicted with respect to a particular device or equipment, it is contemplated that other devices or equipment (e.g., network elements, servers, etc.) within FIG. 23 can deploy the illustrated hardware and components of system 2300. Computer system 2300 is programmed (e.g., via computer program code or instructions) to process one or more images to determine camera location information and/or camera pose information, wherein these information are represented according to a global coordinate system, thereby causing, at least in part, an association of these information with the one or more images as meta-data information as described herein and includes a communication mechanism such as a bus 2310 for passing information between other internal and external components of the computer system 2300. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 2300, or a portion thereof, constitutes a means for performing one or more steps of processing one or more images to determine camera location information and/or camera pose information, wherein these information are represented according to a global coordinate system, thereby causing, at least in part, an association of these information with the one or more images as meta-data information.

A bus 2310 includes one or more parallel conductors of information so that information is transferred quickly among devices coupled to the bus 2310. One or more processors 2302 for processing information are coupled with the bus 2310.

A processor (or multiple processors) 2302 performs a set of operations on information as specified by computer program code related to processing one or more images to determine camera location information and/or camera pose information, wherein these information are represented according to a global coordinate system, thereby causing, at least in part, an association of these information with the one or more images as meta-data information. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 2310 and placing information on the bus 2310. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 2302, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 2300 also includes a memory 2304 coupled to bus 2310. The memory 2304, such as a random access memory (RAM) or any other dynamic storage device, stores information including processor instructions for processing one or more images to determine camera location information and/or camera pose information, wherein these information are represented according to a global coordinate system, thereby causing, at least in part, an association of these information with the one or more images as meta-data information. Dynamic memory allows information stored therein to be changed by the computer system 2300. RAM allows a unit of information stored at a location called a memory address to be stored and retrieved independently of information at neighboring addresses. The memory 2304 is also used by the processor 2302 to store temporary values during execution of processor instructions. The computer system 2300 also includes a read only memory (ROM) 2306 or any other static storage device coupled to the bus 2310 for storing static information, including instructions, that is not changed by the computer system 2300. Some memory is composed of volatile storage that loses the information stored thereon when power is lost. Also coupled to bus 2310 is a non-volatile (persistent) storage device 2308, such as a magnetic disk, optical disk or flash card, for storing information, including instructions, that persists even when the computer system 2300 is turned off or otherwise loses power.

Information, including instructions for processing one or more images to determine camera location information and/or camera pose information, wherein these information are represented according to a global coordinate system, thereby causing, at least in part, an association of these information with the one or more images as meta-data information, is provided to the bus 2310 for use by the processor from an external input device 2312, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 2300. Other external devices coupled to bus 2310, used primarily for interacting with humans, include a display device 2314, such as a cathode ray tube (CRT), a liquid crystal display (LCD), a light emitting diode (LED) display, an organic LED (OLED) display, a plasma screen, or a printer for presenting text or images, and a pointing device 2316, such as a mouse, a trackball, cursor direction keys, or a motion sensor, for controlling a position of a small cursor image presented on the display 2314 and issuing commands associated with graphical elements presented on the display 2314, and one or more camera sensors 2394 for capturing, recording and causing to store one or more still and/or moving images (e.g., videos, movies, etc.) which also may comprise audio recordings. In some embodiments, for example, in embodiments in which the computer system 2300 performs all functions automatically without human input, one or more of external input device 2312, display device 2314 and pointing device 2316 may be omitted.

In the illustrated embodiment, special purpose hardware, such as an application specific integrated circuit (ASIC) 2320, is coupled to bus 2310. The special purpose hardware is configured to perform operations not performed by processor 2302 quickly enough for special purposes. Examples of ASICs include graphics accelerator cards for generating images for display 2314, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 2300 also includes one or more instances of a communications interface 2370 coupled to bus 2310. Communication interface 2370 provides a one-way or two-way communication coupling to a variety of external devices that operate with their own processors, such as printers, scanners and external disks. In general the coupling is with a network link 2378 that is connected to a local network 2380 to which a variety of external devices with their own processors are connected. For example, communication interface 2370 may be a parallel port or a serial port or a universal serial bus (USB) port on a personal computer. In some embodiments, communications interface 2370 is an integrated services digital network (ISDN) card or a digital subscriber line (DSL) card or a telephone modem that provides an information communication connection to a corresponding type of telephone line. In some embodiments, a communication interface 2370 is a cable modem that converts signals on bus 2310 into signals for a communication connection over a coaxial cable or into optical signals for a communication connection over a fiber optic cable. As another example, communications interface 2370 may be a local area network (LAN) card to provide a data communication connection to a compatible LAN, such as Ethernet. Wireless links may also be implemented. For wireless links, the communications interface 2370 sends or receives or both sends and receives electrical, acoustic or electromagnetic signals, including infrared and optical signals, that carry information streams, such as digital data. For example, in wireless handheld devices, such as mobile telephones like cell phones, the communications interface 2370 includes a radio band electromagnetic transmitter and receiver called a radio transceiver. In certain embodiments, the communications interface 2370 enables connection to the communication network 107 for processing one or more images to determine camera location information and/or camera pose information, wherein these information are represented according to a global coordinate system, thereby causing, at least in part, an association of these information with the one or more images as meta-data information to the UE 101.

The term "computer-readable medium" as used herein refers to any medium that participates in providing information to processor 2302, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 2308. Volatile media include, for example, dynamic memory 2304. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 2320.

Network link 2378 typically provides information communication using transmission media through one or more networks to other devices that use or process the information. For example, network link 2378 may provide a connection through local network 2380 to a host computer 2382 or to equipment 2384 operated by an Internet Service Provider (ISP). ISP equipment 2384 in turn provides data communication services through the public, world-wide packet-switching communication network of networks now commonly referred to as the Internet 2390.

A computer called a server host 2392 connected to the Internet hosts a process that provides a service in response to information received over the Internet. For example, server host 2392 hosts a process that provides information representing video data for presentation at display 2314. It is contemplated that the components of system 2300 can be deployed in various configurations within other computer systems, e.g., host 2382 and server 2392.

At least some embodiments of the invention are related to the use of computer system 2300 for implementing some or all of the techniques described herein. According to one embodiment of the invention, those techniques are performed by computer system 2300 in response to processor 2302 executing one or more sequences of one or more processor instructions contained in memory 2304. Such instructions, also called computer instructions, software and program code, may be read into memory 2304 from another computer-readable medium such as storage device 2308 or network link 2378. Execution of the sequences of instructions contained in memory 2304 causes processor 2302 to perform one or more of the method steps described herein. In alternative embodiments, hardware, such as ASIC 2320, may be used in place of or in combination with software to implement the invention. Thus, embodiments of the invention are not limited to any specific combination of hardware and software, unless otherwise explicitly stated herein.

The signals transmitted over network link 2378 and other networks through communications interface 2370, carry information to and from computer system 2300. Computer system 2300 can send and receive information, including program code, through the networks 2380, 2390 among others, through network link 2378 and communications interface 2370. In an example using the Internet 2390, a server host 2392 transmits program code for a particular application, requested by a message sent from computer 2300, through Internet 2390, ISP equipment 2384, local network 2380 and communications interface 2370. The received code may be executed by processor 2302 as it is received, or may be stored in memory 2304 or in storage device 2308 or any other non-volatile storage for later execution, or both. In this manner, computer system 2300 may obtain application program code in the form of signals on a carrier wave.

Various forms of computer readable media may be involved in carrying one or more sequence of instructions or data or both to processor 2302 for execution. For example, instructions and data may initially be carried on a magnetic disk of a remote computer such as host 2382. The remote computer loads the instructions and data into its dynamic memory and sends the instructions and data over a telephone line using a modem. A modem local to the computer system 2300 receives the instructions and data on a telephone line and uses an infra-red transmitter to convert the instructions and data to a signal on an infra-red carrier wave serving as the network link 2378. An infrared detector serving as communications interface 2370 receives the instructions and data carried in the infrared signal and places information representing the instructions and data onto bus 2310. Bus 2310 carries the information to memory 2304 from which processor 2302 retrieves and executes the instructions using some of the data sent with the instructions. The instructions and data received in memory 2304 may optionally be stored on storage device 2308, either before or after execution by the processor 2302.

FIG. 24 illustrates a chip set or chip 2400 upon which an embodiment of the invention may be implemented. Chip set 2400 is programmed to process one or more images to determine camera location information and/or camera pose information, wherein these information are represented according to a global coordinate system, thereby causing, at least in part, an association of these information with the one or more images as meta-data information as described herein and includes, for instance, the processor and memory components described with respect to FIG. 23 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 2400 can be implemented in a single chip. It is further contemplated that in certain embodiments the chip set or chip 2400 can be implemented as a single "system on a chip." It is further contemplated that in certain embodiments a separate ASIC would not be used, for example, and that all relevant functions as disclosed herein would be performed by a processor or processors. Chip set or chip 2400, or a portion thereof, constitutes a means for performing one or more steps of providing user interface navigation information associated with the availability of functions. Chip set or chip 2400, or a portion thereof, constitutes a means for performing one or more steps of processing one or more images to determine camera location information and/or camera pose information, wherein these information are represented according to a global coordinate system, thereby causing, at least in part, an association of these information with the one or more images as meta-data information.

In one embodiment, the chip set or chip 2400 includes a communication mechanism such as a bus 2401 for passing information among the components of the chip set 2400. A processor 2403 has connectivity to the bus 2401 to execute instructions and process information stored in, for example, a memory 2405. The processor 2403 may include one or more processing cores with each core configured to perform independently. A multi-core processor enables multiprocessing within a single physical package. Examples of a multi-core processor include two, four, eight, or greater numbers of processing cores. Alternatively or in addition, the processor 2403 may include one or more microprocessors configured in tandem via the bus 2401 to enable independent execution of instructions, pipelining, and multithreading. The processor 2403 may also be accompanied with one or more specialized components to perform certain processing functions and tasks such as one or more digital signal processors (DSP) 2407, or one or more application-specific integrated circuits (ASIC) 2409. A DSP 2407 typically is configured to process real-world signals (e.g., sound) in real time independently of the processor 2403. Similarly, an ASIC 2409 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 2400 includes merely one or more processors and some software and/or firmware supporting and/or relating to and/or for the one or more processors.

The processor 2403 and accompanying components have connectivity to the memory 2405 via the bus 2401. The memory 2405 includes both dynamic memory (e.g., RAM, magnetic disk, writable optical disk, etc.) and static memory (e.g., ROM, CD-ROM, etc.) for storing executable instructions that when executed perform the inventive steps described herein to process one or more images to determine camera location information and/or camera pose information, wherein these information are represented according to a global coordinate system, thereby causing, at least in part, an association of these information with the one or more images as meta-data information. The memory 2405 also stores the data associated with or generated by the execution of the inventive steps.

Figure 25:
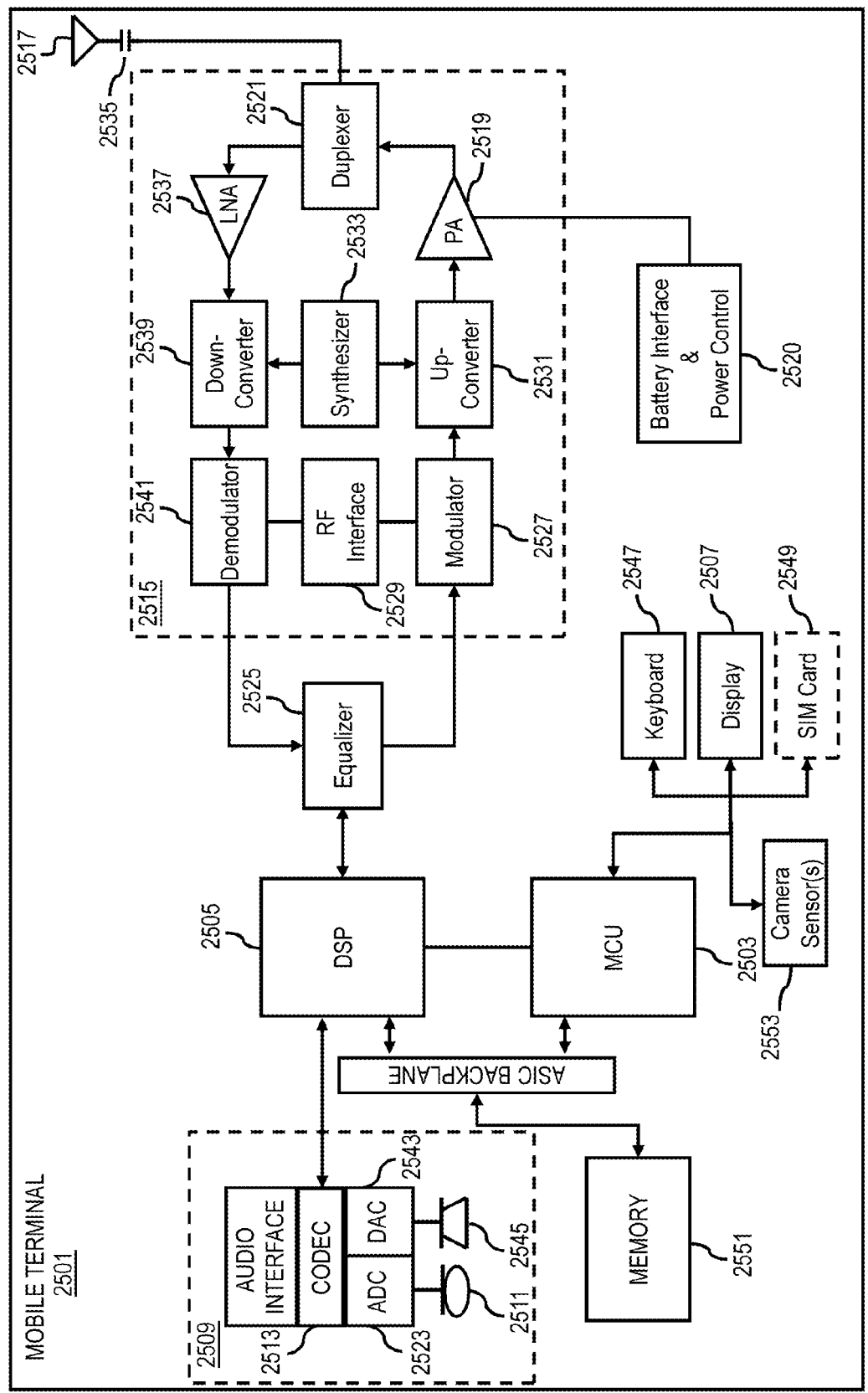
FIG. 25 is a diagram of a mobile terminal (e.g., handset) that can be used to implement an embodiment of the invention.

FIG. 25 is a diagram of exemplary components of a mobile terminal (e.g., handset) for communications, which is capable of operating in the system of FIG. 1, according to one embodiment. In some embodiments, mobile terminal 2501, or a portion thereof, constitutes a means for performing one or more steps of processing one or more images to determine camera location information and/or camera pose information, wherein these information are represented according to a global coordinate system, thereby causing, at least in part, an association of these information with the one or more images as meta-data information. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a base-band integrated circuit or applications processor integrated circuit in a mobile phone or a similar integrated circuit in a cellular network device or other network devices.

Pertinent internal components of the telephone include a Main Control Unit (MCU) 2503, a Digital Signal Processor (DSP) 2505, and a receiver/transmitter unit including a microphone gain control unit and a speaker gain control unit. A main display unit 2507 provides a display to the user in support of various applications and mobile terminal functions that perform or support the steps of processing one or more images to determine camera location information and/or camera pose information, wherein these information are represented according to a global coordinate system, thereby causing, at least in part, an association of these information with the one or more images as meta-data information. The display 2507 includes display circuitry configured to display at least a portion of a user interface of the mobile terminal (e.g., mobile telephone). Additionally, the display 2507 and display circuitry are configured to facilitate user control of at least some functions of the mobile terminal. An audio function circuitry 2509 includes a microphone 2511 and microphone amplifier that amplifies the speech signal output from the microphone 2511. The amplified speech signal output from the microphone 2511 is fed to a coder/decoder (CODEC) 2513.

A radio section 2515 amplifies power and converts frequency in order to communicate with a base station, which is included in a mobile communication system, via antenna 2517. The power amplifier (PA) 2519 and the transmitter/modulation circuitry are operationally responsive to the MCU 2503, with an output from the PA 2519 coupled to the duplexer 2521 or circulator or antenna switch, as known in the art. The PA 2519 also couples to a battery interface and power control unit 2520.

In use, a user of mobile terminal 2501 speaks into the microphone 2511 and his or her voice along with any detected background noise is converted into an analog voltage. The analog voltage is then converted into a digital signal through the Analog to Digital Converter (ADC) 2523. The control unit 2503 routes the digital signal into the DSP 2505 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 2525 for compensation of any frequency-dependent impairments that occur during transmission though the air such as phase and amplitude distortion. After equalizing the bit stream, the modulator 2527 combines the signal with a RF signal generated in the RF interface 2529. The modulator 2527 generates a sine wave by way of frequency or phase modulation. In order to prepare the signal for transmission, an up-converter 2531 combines the sine wave output from the modulator 2527 with another sine wave generated by a synthesizer 2533 to achieve the desired frequency of transmission. The signal is then sent through a PA 2519 to increase the signal to an appropriate power level. In practical systems, the PA 2519 acts as a variable gain amplifier whose gain is controlled by the DSP 2505 from information received from a network base station. The signal is then filtered within the duplexer 2521 and optionally sent to an antenna coupler 2535 to match impedances to provide maximum power transfer. Finally, the signal is transmitted via antenna 2517 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 2501 are received via antenna 2517 and immediately amplified by a low noise amplifier (LNA) 2537. A down-converter 2539 lowers the carrier frequency while the demodulator 2541 strips away the RF leaving only a digital bit stream. The signal then goes through the equalizer 2525 and is processed by the DSP 2505. A Digital to Analog Converter (DAC) 2543 converts the signal and the resulting output is transmitted to the user through the speaker 2545, all under control of a Main Control Unit (MCU) 2503 which can be implemented as a Central Processing Unit (CPU).

The MCU 2503 receives various signals including input signals from the keyboard 2547. The keyboard 2547 and/or the MCU 2503 in combination with other user input components (e.g., the microphone 2511) comprise a user interface circuitry for managing user input. The MCU 2503 runs a user interface software to facilitate user control of at least some functions of the mobile terminal 2501 to process one or more images to determine camera location information and/or camera pose information, wherein these information are represented according to a global coordinate system, thereby causing, at least in part, an association of these information with the one or more images as meta-data information. The MCU 2503 also delivers a display command and a switch command to the display 2507 and to the speech output switching controller, respectively. Further, the MCU 2503 exchanges information with the DSP 2505 and can access an optionally incorporated SIM card 2549 and a memory 2551. In addition, the MCU 2503 executes various control functions required of the terminal. The DSP 2505 may, depending upon the implementation, perform any of a variety of conventional digital processing functions on the voice signals. Additionally, DSP 2505 determines the background noise level of the local environment from the signals detected by microphone 2511 and sets the gain of microphone 2511 to a level selected to compensate for the natural tendency of the user of the mobile terminal 2501.

The CODEC 2513 includes the ADC 2523 and DAC 2543. The memory 2551 stores various data including call incoming tone data and is capable of storing other data including music data received via, e.g., the global Internet. The software module could reside in RAM memory, flash memory, registers, or any other form of writable storage medium known in the art. The memory device 2551 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 2549 carries, for instance, important information, such as the cellular phone number, the carrier supplying service, subscription details, and security information. The SIM card 2549 serves primarily to identify the mobile terminal 2501 on a radio network. The card 2549 also contains a memory for storing a personal telephone number registry, text messages, and user specific mobile terminal settings.

Further, one or more camera sensors 2553 may be incorporated onto the mobile station 2501 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:

processing one or more images to determine camera location information and camera pose information associated with at least one camera capturing the one or more images, wherein the camera location information and the camera pose information are represented according to an Earth Centered, Earth Fixed (ECEF) 3D Cartesian coordinate system;

processing the one or more images to determine a local point cloud of one or more objects depicted in the one or more images, wherein the local point cloud is represented according to a local 3D Cartesian coordinate system;

matching the local three-dimensional point cloud represented according to the local 3D Cartesian coordinate system to one or more reference point clouds represented according to the ECEF 3D Cartesian coordinate system to determine the camera location information and the camera pose information according to the ECEF 3D Cartesian coordinate system;

associating the camera location information and the camera pose information represented according to the ECEF Cartesian coordinate system with the one or more images as meta-data information to form an augmented content; and rendering the augmented content, based on the associated camera location information and the camera pose information, wherein the rendering of the augmented content is more accurate than a related rendering based upon rough sensor data of the one or more images.

2. A method of claim 1, further comprising:

mapping the local three-dimensional point cloud to the ECEF Cartesian coordinate system based, at least in part, on the matching.

3. A method of claim 1, further comprising:

determining the one or more reference point clouds based, at least in part, on the camera location information, location sensor data, or a combination thereof associated with the at least one camera.

4. A method of claim 1, further comprising:

determining overlay information based, at least in part, on the camera location information and the camera pose information; and a rendering of the overlay information in the one or more images.

5. A method of claim 4, wherein the overlay information includes, at least in part, point-of-interest information, social messaging information, location-based service information, or a combination thereof.

6. A method of claim 1, wherein the one or more images are part of at least one video sequence, the method further comprising:

selecting the one or more images from among one or more frames of the at least one video sequence, wherein the one or more images represent, at least in part, a subset of the one or more frames.

7. A method of claim 1, further comprising:

determining one or more panoramic images based, at least in part, on the camera location information and the camera pose information;

determining field of view information for the one or more images based, at least in part, on the camera location information and the camera pose information; and causing, at least in part, an extension of the one or more images with at least a portion of the one or more panoramic images based, at least in part, on the field of view information.

8. A method of claim 1, further comprising:

determining one or more other images associated with other camera location information and other camera pose information based, at least in part, on the camera location information and the camera pose information; and associating the one or more other images with the one or more images for interaction by at least one user during playback of the one or more images.

9. A method of claim 8, wherein the one or more other images are further determined based, at least in part, on one or more contextual criteria, and wherein one or more contextual criteria include, at least in part, one or more temporal criteria.

10. A method of claim 1, wherein the local 3D Cartesian coordinate system has an origin point on the Earth's surface and covers a limited space; and wherein the ECEF Cartesian coordinate system has an origin point at the center of the mass of the Earth.

11. An apparatus comprising:

at least one processor; and at least one memory including computer program code for one or more programs, the at least one memory and the computer program code configured to, with the at least one processor, cause the apparatus to perform at least the following, process and/or facilitate a processing of one or more images to determine camera location information and camera pose information associated with at least one camera capturing the one or more images, wherein the camera location information and the camera pose information are represented according to an Earth Centered, Earth Fixed (ECEF) 3D Cartesian coordinate system, process and/or facilitate a processing of the one or more images to determine a local point cloud of one or more objects depicted in the one or more images, wherein the local point cloud is represented according to a local 3D Cartesian coordinate system, match the local three-dimensional point cloud represented according to the local 3D Cartesian coordinate system to one or more reference point clouds represented according to the ECEF 3D Cartesian coordinate system to determine the camera location information and the camera pose information according to the ECEF 3D Cartesian coordinate system, and associate the camera location information and the camera pose information represented according to the ECEF Cartesian coordinate system with the one or more images as meta-data information to form an augmented content, and cause, at least in part, a rendering of the augmented content, based on the associated camera location information and the camera pose information, wherein the rendering of the augmented content is more accurate than a related rendering based upon rough sensor data of the one or more images.

12. An apparatus of claim 11, wherein the apparatus is further caused to:

map the local three-dimensional point cloud to the ECEF Cartesian coordinate system based, at least in part, on the matching.

13. An apparatus of claim 11, wherein the apparatus is further caused to:
  determine the one or more reference point clouds based, at least in part, on the camera location information, location sensor data, or a combination thereof associated with the at least one camera.

14. An apparatus of claim 11, wherein the apparatus is further caused to:
  determine overlay information based, at least in part, on the camera location information and the camera pose information, and
  cause, at least in part, a rendering of the overlay information in the one or more images.

15. An apparatus of claim 14, wherein the overlay information includes, at least in part, point-of-interest information, social messaging information, location-based service information, or a combination thereof.

16. An apparatus of claim 11, wherein the one or more images are part of at least one video sequence, and wherein the apparatus is further caused to:
  select the one or more images from among one or more frames of the at least one video sequence,
  wherein the one or more images represent, at least in part, a subset of the one or more frames.

17. An apparatus of claim 11, wherein the apparatus is further caused to:
  determine one or more panoramic images based, at least in part, on the camera location information and the camera pose information,
  determine field of view information for the one or more images based, at least in part, on the camera location information and the camera pose information, and
  cause, at least in part, an extension of the one or more images with at least a portion of the one or more panoramic images based, at least in part, on the field of view information.

18. An apparatus of claim 11, wherein the apparatus is further caused to:
  determine one or more other images associated with other camera location information and other camera pose information based, at least in part, on the camera location information and the camera pose information, and
  cause, at least in part, an association of the one or more other images with the one or more images for interaction by at least one user during playback of the one or more images.

19. An apparatus of claim 18, wherein the one or more other images are further determined based, at least in part, on one or more contextual criteria, and wherein one or more contextual criteria include, at least in part, one or more temporal criteria.

20. An apparatus of claim 11, wherein the local 3D Cartesian coordinate system has an origin point on the Earth's surface and covers a limited space; and wherein the ECEF Cartesian coordinate system has an origin point at the center of the mass of the Earth.

* * * * *